United States Patent
Qian et al.

(10) Patent No.: US 12,292,933 B2
(45) Date of Patent: May 6, 2025

(54) IDENTIFYING INSTANCES OF DIGITAL CONTENT

(71) Applicant: Adobe Inc., San Jose, CA (US)

(72) Inventors: Jennifer Jiaying Qian, New York, NY (US); Mateus De Araujo Lopes, Naperville, IL (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/206,901

(22) Filed: Jun. 7, 2023

(65) Prior Publication Data

US 2024/0311428 A1    Sep. 19, 2024

Related U.S. Application Data

(60) Provisional application No. 63/490,874, filed on Mar. 17, 2023.

(51) Int. Cl.
| | |
|---|---|
| *G06F 16/903* | (2019.01) |
| *G06F 16/55* | (2019.01) |
| *G06F 16/58* | (2019.01) |
| *G06F 16/906* | (2019.01) |
| *G06F 40/295* | (2020.01) |
| *G06F 40/30* | (2020.01) |
| *G06N 20/00* | (2019.01) |

(52) U.S. Cl.
CPC ........ *G06F 16/90344* (2019.01); *G06F 16/55* (2019.01); *G06F 16/5866* (2019.01); *G06F 16/906* (2019.01); *G06F 40/295* (2020.01); *G06F 40/30* (2020.01); *G06N 20/00* (2019.01)

(58) Field of Classification Search
CPC .. G06F 16/90344; G06F 16/906; G06F 16/35; G06F 16/5866; G06F 40/295; G06F 40/30; G06N 20/00

USPC .......................................................... 707/758
See application file for complete search history.

(56) References Cited

U.S. PATENT DOCUMENTS

| | | | |
|---|---|---|---|
| 10,846,328 B2 * | 11/2020 | Le Bleis | ............... G06F 16/156 |
| 10,887,640 B2 * | 1/2021 | Swaminathan | .... H04N 21/8549 |
| 2018/0247648 A1 * | 8/2018 | Nadimpalli | ............. G10L 15/22 |

(Continued)

OTHER PUBLICATIONS

Qian, Jennifer Jiaying, et al., "US Application as Filed", U.S. Appl. No. 18/206,987, filed Jun. 7, 2023, 80 pages.

(Continued)

*Primary Examiner* — Joshua Bullock
(74) *Attorney, Agent, or Firm* — FIG. 1 Patents

(57) ABSTRACT

In implementations of systems for identifying instances of digital content, a computing device implements a content system to receive input data describing attributes of an entity segment and keywords that are associated with the attributes of the entity segment. The content system determines additional keywords that are semantically similar to the keywords using a machine-learning model trained on training data to classify semantically similar keywords. A set of matchable keywords is compiled that includes the keywords and the additional keywords. The content system identifies candidate instances of digital content based on content keywords assigned to the candidate instances of digital content and the set of matchable keywords. An indication of an instance of digital content is generated for display in a user interface based on the candidate instances of digital content.

20 Claims, 22 Drawing Sheets

(56) References Cited

U.S. PATENT DOCUMENTS

| | | | |
|---|---|---|---|
| 2019/0295126 A1* | 9/2019 | Madden | G06N 20/00 |
| 2020/0160229 A1* | 5/2020 | Atcheson | G06N 20/00 |
| 2021/0042366 A1* | 2/2021 | Hicklin | G06F 16/9035 |
| 2021/0232621 A1* | 7/2021 | Jain | G06Q 30/0269 |
| 2021/0304253 A1* | 9/2021 | Kumbi | G06F 40/30 |
| 2021/0342552 A1* | 11/2021 | Mishra | G06F 40/30 |
| 2022/0114624 A1* | 4/2022 | Jain | G06F 40/279 |
| 2023/0072498 A1* | 3/2023 | Woodward | G06F 3/067 |
| 2023/0169139 A1* | 6/2023 | Baek | G06N 20/00 707/722 |
| 2023/0214679 A1* | 7/2023 | Xu | G06F 18/2113 706/47 |
| 2023/0367821 A1* | 11/2023 | Hicklin | G06F 40/30 |
| 2024/0311424 A1 | 9/2024 | Qian et al. | |

OTHER PUBLICATIONS

Qian, Jennifer Jiaying, et al., "US Provisional Application as Filed", U.S. Appl. No. 63/490,874, filed Mar. 17, 2023, 57 pages.

* cited by examiner

IDENTIFYING INSTANCES OF DIGITAL CONTENT

RELATED APPLICATIONS

This application claims priority under 35 U.S.C. § 119(e) to U.S. Provisional Patent Application No. 63/490,874 filed Mar. 17, 2023 and titled "Identifying Instances of Digital Content," the entire disclosure of which is hereby incorporated by reference.

BACKGROUND

Instances of digital content such as digital images are frequently labeled or "tagged" with metadata describing keywords that indicate characteristics of the digital content. For example, a digital image depicting a sailboat in the ocean is tagged with keywords such as "water," "boat," "ocean," "sailing," and so on to describe "what" is included in the digital image. Because the digital image depicting the sailboat in the ocean is labeled with the keywords, it is possible to identify this digital image via a search for images using search terms that match the keywords. For instance, a search for images using the search term "sailing" returns the digital image depicting the sailboat in the ocean and other digital images having metadata describing the keyword "sailing."

SUMMARY

Techniques and systems for identifying instances of digital content are described. In an example, a computing device implements a content system to receive input data describing attributes of an entity segment and keywords associated with the attributes of the entity segment. The content system determines additional keywords from a keyword corpus that are semantically similar to the keywords using a machine-learning model trained on training data to classify semantically similar keywords.

For example, the content system compiles a set of matchable keywords that includes the keywords and the additional keywords. The content system identifies candidate instances of digital content from a content repository based on content keywords assigned to the candidate instances of digital content and the set of matchable keywords. In one example, the content system computes match scores for the candidate instances of digital content based on amounts of semantic overlap between the set of matchable keywords and the content keywords assigned to the candidate instances of digital content. An indication of an instance of digital content is generated for display in a user interface based on the match scores.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
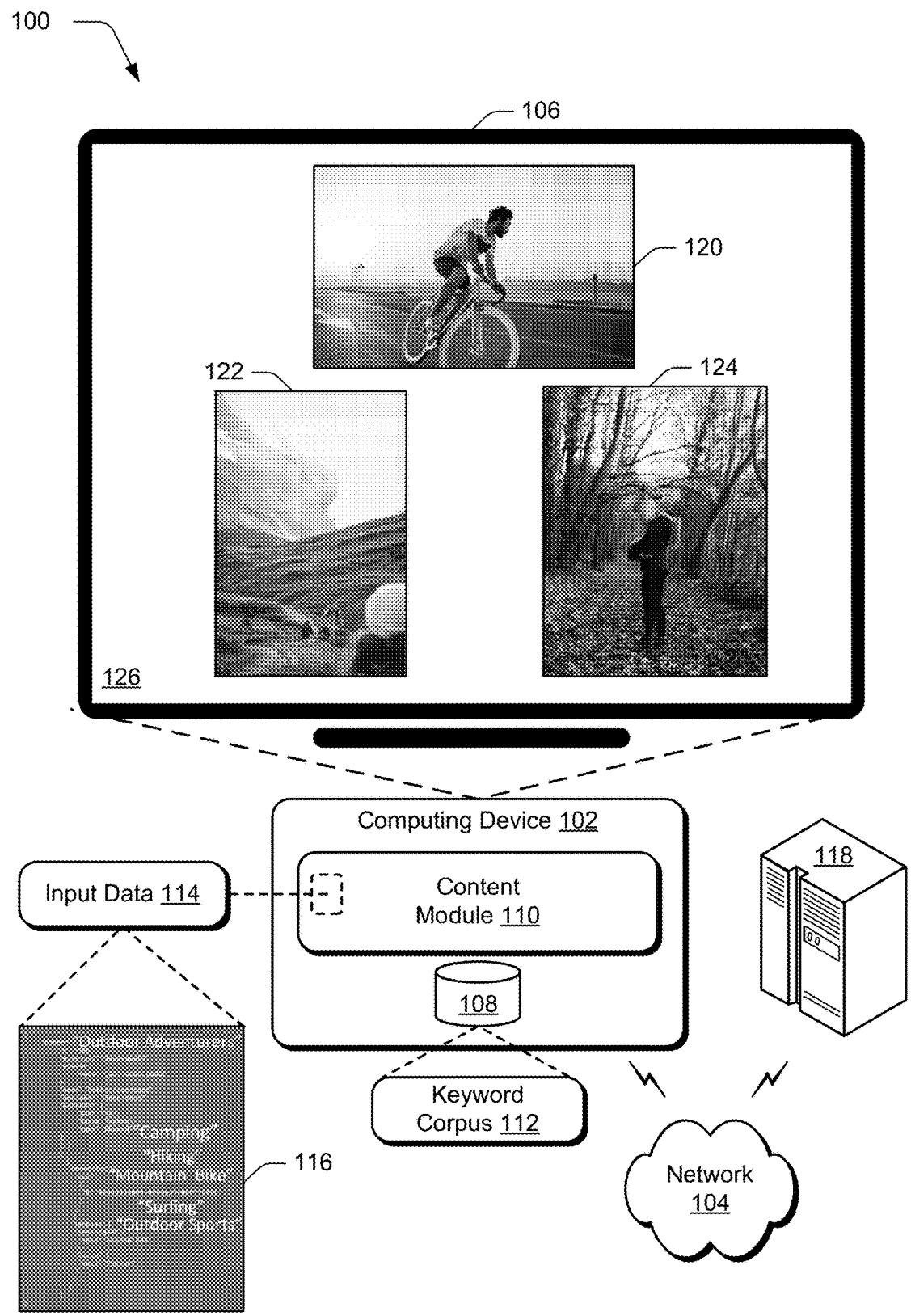
FIG. 1 is an illustration of an environment in an example implementation that is operable to employ digital systems and techniques for identifying instances of digital content as described herein.

Instances of digital content such as digital images that are labeled or "tagged" with metadata describing keywords which indicate features or characteristics of the digital images are identifiable by performing a search for digital images using search terms that match the keywords. In conventional systems for identifying instances of digital content, a user interacts with an input device (e.g., a mouse, a stylus, a keyboard, a microphone, etc.) relative to a search interface to manually specify a search term that describes features or characteristics of instances of digital content that are desired by the user. In addition to manual specification by the user of the search term, it is possible that available items of digital content having the features or characteristics desired by the user are not included in search results displayed via the search interface based on the search term. This is because the search term specified by the user is different from keywords described by metadata of the available items of digital content which is a limitation of conventional systems for identifying items of digital content.

In order to address these limitations and technical challenges, techniques and systems are described for identifying instances of digital content. For example, a computing device implements a content system to receive input data describing attributes of an entity segment and keywords associated with the attributes of the entity segment, e.g., of a user population. In some examples, keywords associated with the attributes of the entity segment are determined based on analytics data describing interactions of entities included in the entity segment, e.g., with instances of digital content.

In an example, the content system determines additional keywords from a keyword corpus that are semantically similar to the keywords using a machine-learning model trained on training data to classify semantically similar keywords. In one example, the machine-learning model includes a natural language processing model and a naive Bayes classifier. The natural language processing model generates vector representations of a pair of input keywords and the naive Bayes classifier learns to classify the input keywords as semantically similar or not semantically similar based on the vector representations as part of training the machine-learning model on training data.

For example, the content system compiles a set of matchable keywords that includes the keywords and the additional keywords as a search input for identifying instances of digital content. In this example, the instances of digital content include reusable digital images, reusable digital videos, reusable content fragments (e.g., presentation agnostic content), reusable experience fragments (e.g., designs and/or layouts of content), and so forth. The content system identifies candidate instances of digital content from a content repository based on content keywords assigned to the candidate instances of digital content and the set of matchable keywords. In some examples, the content keywords are assigned to the candidate instances of digital content using a first additional machine-learning model trained on training data to assign sets of content keywords to instances of digital content, e.g., as a classifier. In other examples, the content keywords are assigned to the candidate instances of digital content via "tagging" or labeling the candidate instances of digital content with the content keywords, e.g., manually via a user interface.

In an example, the content system generates match scores for the candidate instances of digital content based on relative amounts of semantic overlap between the set of matchable keywords and the content keywords assigned to the candidate instances of digital content. For example, the content system generates the match scores for the candidate instances of digital content using a second additional machine-learning model trained on training data to generate match scores for candidate instances of digital content.

The match scores generated for the candidate instances of digital content indicate relative amounts of semantic overlap between the set of matchable keywords and the content keywords assigned to the candidate instances of digital content. Accordingly, a relatively high match score for a particular candidate instance of digital content indicates a relatively large amount of semantic overlap between the set of matchable keywords and particular content keywords assigned to the particular candidate instance of digital content. The content system selects an instance of digital content from the candidate instances of digital content based on the instance of digital content having a highest match score of the match scores.

An indication of the instance of digital content is generated for display in a user interface. Unlike conventional systems that are limited to manually searching for instances of digital content using search keywords which may or may not match content keywords assigned to the instances of digital content, the described systems for identifying instances of digital content automatically identify instances of digital content based on the set of matchable keywords as a search input. Since the set of matchable keywords includes both the keywords associated with the attributes of the entity segment and also the additional keywords that are semantically similar to the keywords, the described systems are capable of identifying instances of digital content in scenarios in which content keywords assigned to the instances of digital content do not match the keywords but do match the additional keywords. This is not possible in the conventional systems that are limited to searching for instances of digital content using manually specified search terms.

Term Examples

As used herein, the term "entity" refers to a first individual body that that exists independently of a second individual body. Examples of entities include a computing device, an organization, a user, etc.

As used herein, the term "entity segment" refers to a grouping or a subset of entities based on an association with at least one attribute, e.g., a segment of a user population.

As used herein, the term "attribute" of an entity segment refers to a definable quality or characteristic of an entity. Example attributes of an entity that is an organization include public, private, government, non-government, secular, non-secular, and so forth.

As used herein, the term "machine-learning model" refers to a computer representation that is tunable (e.g., trainable) based on inputs to approximate unknown functions. By way of example, the term "machine-learning model" includes a model that utilizes algorithms to learn from, and make predictions on, known data by analyzing the known data to learn to generate outputs that reflect patterns and attributes of the known data. According to various implementations, such a machine-learning model uses supervised learning, semi-supervised learning, unsupervised learning, reinforcement learning, and/or transfer learning. For example, the machine-learning model is capable of including, but is not limited to, clustering, decision trees, support vector machines, linear regression, logistic regression, Bayesian networks, random forest learning, dimensionality reduction algorithms, boosting algorithms, transformers, artificial neural networks (e.g., fully-connected neural networks, deep convolutional neural networks, or recurrent neural networks), deep learning, etc. By way of example, a machine-learning model makes high-level abstractions in data by generating data-driven predictions or decisions from the known input data.

As used herein, the term "instance of digital content" refers to a reusable item of digital content which is usable (e.g., editable) for communication and/or artistic expression in isolation or with additional instances of digital content. Examples of instances of digital content include digital images, digital videos, content fragments (e.g., presentation agnostic content), experience fragments (e.g., designs and/or layouts of content), etc.

In the following discussion, an example environment is first described that employs examples of techniques described herein. Example procedures are also described which are performable in the example environment and other environments. Consequently, performance of the example procedures is not limited to the example environment and the example environment is not limited to performance of the example procedures.

Instance Identification of Digital Content

FIG. 1 is an illustration of an environment 100 in an example implementation that is operable to employ techniques for identification of digital content and digital content generation as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 is capable of ranging from a full resource device with substantial memory and processor resources (e.g., personal computers, game consoles) to a low-resource device with limited memory and/or processing resources (e.g., mobile devices). In some examples, the computing device 102 is representative of a plurality of different devices such as multiple servers utilized to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. For instance, the computing device 102 includes a storage device 108 and a content module 110. The storage device 108 is illustrated to include a keyword corpus 112 which includes many different keywords (e.g., thousands of different keywords). In an example, the keyword corpus 112 is a custom dictionary of keywords that are capable of describing features or characteristics of digital content. By way of example, keywords included in the keyword corpus 112 that are capable of describing features or characteristics of a digital image depicting athletes playing a game of basketball include "sports," "basketball," "basketball players," "athletes," "competition," and so forth.

The content module 110 is illustrated as having, receiving, and or transmitting input data 114. For instance, the input data 114 describes a JavaScript Open Notation ("JSON") file 116 which indicates attributes of an entity segment and keywords that are associated with the attributes of the entity segment. In an example, the entity segment is named "Outdoor Adventurers" in the JSON file 116, and the content module 110 processes the input data 114 to extract the keywords as including "Camping," "Hiking," "Mountain Bike," "Surfing," and "Outdoor Sports."

Consider an example in which the content module 110 leverages the keywords extracted from the JSON file 116 that are associated with the attributes of the entity segment named "Outdoor Adventures." A machine-learning model is included in or available to the content module 110 to determine additional keywords from the keyword corpus 112 that are semantically similar to the keywords extracted from the JSON file 116. In this example, the content module 110 trains the machine-learning model on training data to classify semantically similar keywords. For example, the machine-learning model includes a naive Bayes classifier and a natural language processing model.

The content module 110 implements the natural language processing model of the machine-learning model to generate a first vector representation of a first keyword extracted from the JSON file 116 (e.g., "Hiking") and a second vector representation of a second keyword included in the keyword corpus 112 (e.g., "Walking"). In an example, the naive Bayes classifier receives the first vector representation and the second vector representation as inputs, and the naive Bayes classifier processes the inputs to generate an indication of semantic similarity for the first keyword extracted from the JSON file 116 (e.g., "Hiking") and the second keyword included in the keyword corpus 112 (e.g., "Walking") as an output. In some examples, the indication of semantic similarity for the first and second keywords is output as a score or a percentage such as 0.85 or 85 percent. In one example, the score/percentage represents an amount of semantic similarity between the first and second keywords. In another example, the score/percentage represents a likelihood that the first and second keywords are semantically similar.

For example, the content module 110 uses the machine-learning model to generate indications of semantic similarity between each of the keywords extracted from the JSON file 116 and each of the keywords included in the keyword corpus 112. In this example, the content module 110 determines keywords from the keyword corpus 112 having semantic similarities with keywords extracted from the JSON file 116 which are above a similarity threshold as the additional keywords. In an example, in order to reduce computational resources utilized in determining the additional keywords from the keyword corpus 112, the content module 110 precomputes vector representations of the keywords included in the keyword corpus 112 using the machine-learning model (e.g., the natural language processing model) such that the precomputed vector representations are comparable with vector representations computed for the keywords extracted from the JSON file 116.

Consider an example in which the content module 110 determines the additional keywords as including "Road Sports," "Woods," "Pets," "Mountains," and "Backpacking." Continuing the example, the content module 110 compiles a set of matchable keywords that includes the keywords extracted from the JSON file 116 and the additional keywords. For example, the content module 110 uses the set of matchable keywords to identify candidate instances of digital content from a content repository 118 which illustrated to be connected to the network 104. The content repository 118 includes a variety of types of instances of digital content such as reusable digital images, reusable digital videos, reusable content fragments (e.g., reusable content), reusable experience fragments (e.g., reusable designs/layouts), and so forth.

In order to identify the candidate instances of digital content from the content repository 118, the content module 110 leverages content keywords assigned to the instances of digital content included in the content repository 118. In an example, the content keywords assigned to the instances of digital content describe features or characteristics of the instances of digital content in the content repository 118. In some examples, the content module 110 identifies the candidate instances of digital content using the machine-learning model to compute indications of semantic similarity between keywords included in the set of matchable keywords and keywords included in the content keywords. In other examples, the content module 110 identifies the candidate instances of digital content from the content repository 118 using an additional machine-learning model trained on additional training data to identify instances of digital content based on sets of matchable keywords.

For example, after identifying the candidate instances of digital content, the content module 110 filters the identified candidate instances of digital content based on a measure of relevancy between content keywords assigned to the identified candidate instances of digital content and the keywords included in the set of matchable keywords. In an example, the content module 110 leverages the machine-learning model to filter the identified candidate instances of digital content based on semantic similarity between the content keywords assigned to the candidate instances of digital content and the keywords included in the set of matchable keywords. In this example, the content module 110 computes a match score for each of the candidate instances of digital content based on the semantic similarity between the content keywords assigned to the candidate instances of digital content and the keywords included in the set of matchable keywords. For instance, the content module 110 generates indications 120-124 of instances of digital content which are displayed in a user interface 126 of the display device 106 based on the match scores of the identified candidate instances of digital content.

As shown, indication 120 is a digital image depicting a person riding a road bike on a street; indication 122 is a digital image depicting people backpacking in a mountainous region; and indication 124 is a digital image depicting a person holding a dog in a wooded area. For instance, the indication 120 depicts features and characteristics that are relevant (e.g., semantically similar) to the keyword "Outdoor Sports" and relevant to the additional keyword "Road Sports." The indication 122 depicts features and characteristics that are relevant to the keyword "Hiking" and also relevant to the additional keywords "Mountains" and "Backpacking." Similarly, the indication 124 depicts features and characteristics that are relevant to the additional keywords "Woods" and "Pets." By leveraging the set of matchable keywords in this manner, the content module 110 is capable of identifying the indications 120-124 of the instances of digital content from thousands (e.g., hundreds of thousands) of instances of digital content included in the content repository 118 automatically and in substantially real time in some examples. This is not possible using conventional systems that are limited to performing keyword searches for the instances of digital content included in the content repository 118 which may or may not match the content keywords assigned to the instances of digital content.

Figure 2:
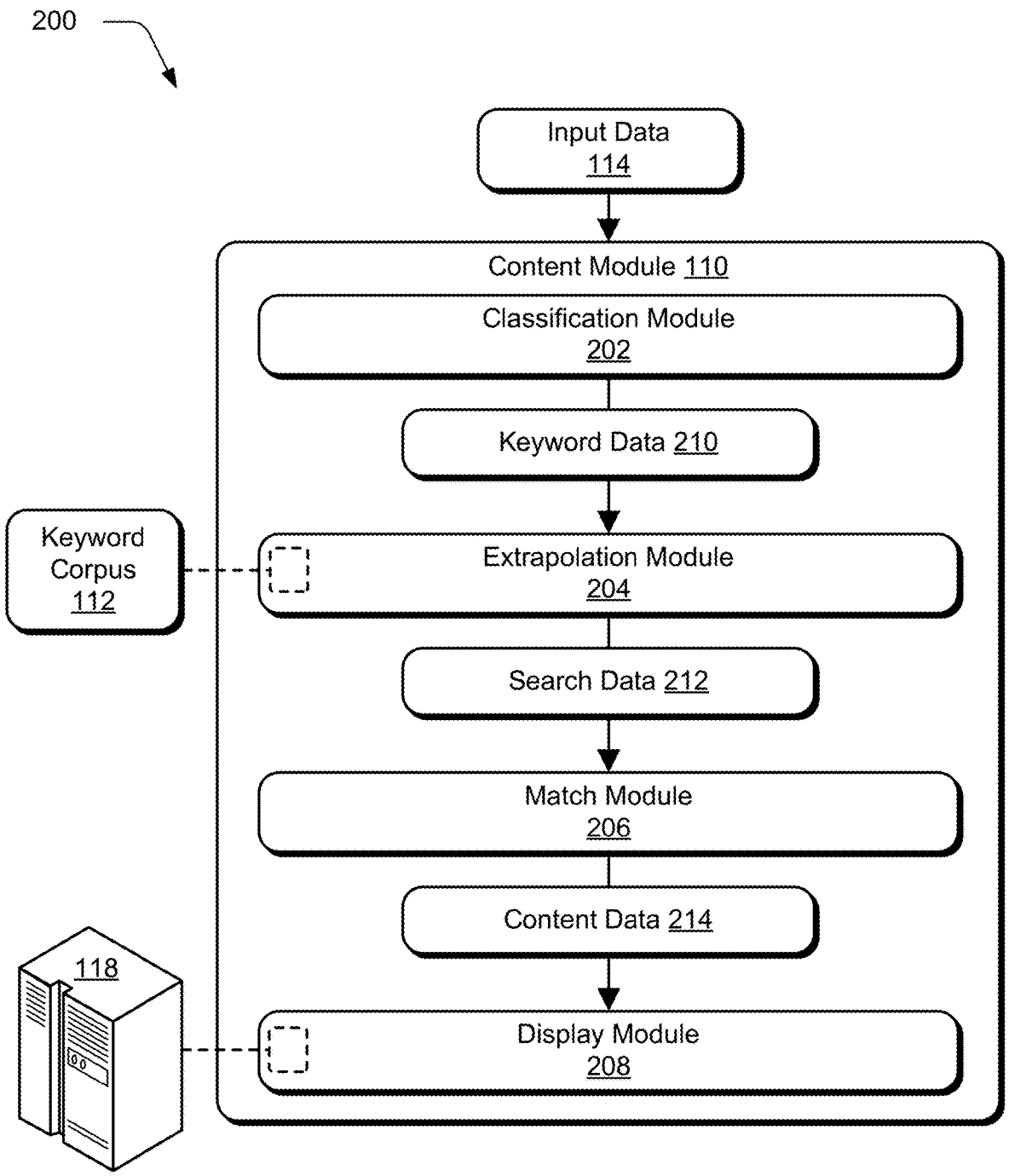
FIG. 2 depicts a system in an example implementation showing operation of a content module for identifying instances of digital content.

FIG. 2 depicts a system 200 in an example implementation showing operation of a content module 110. The content module 110 as illustrated includes a classification module 202, an extrapolation module 204, a match module 206, and a display module 208. For example, the classification module 202 receives and processes the input data 114 to generate keyword data 210.

Figure 3:
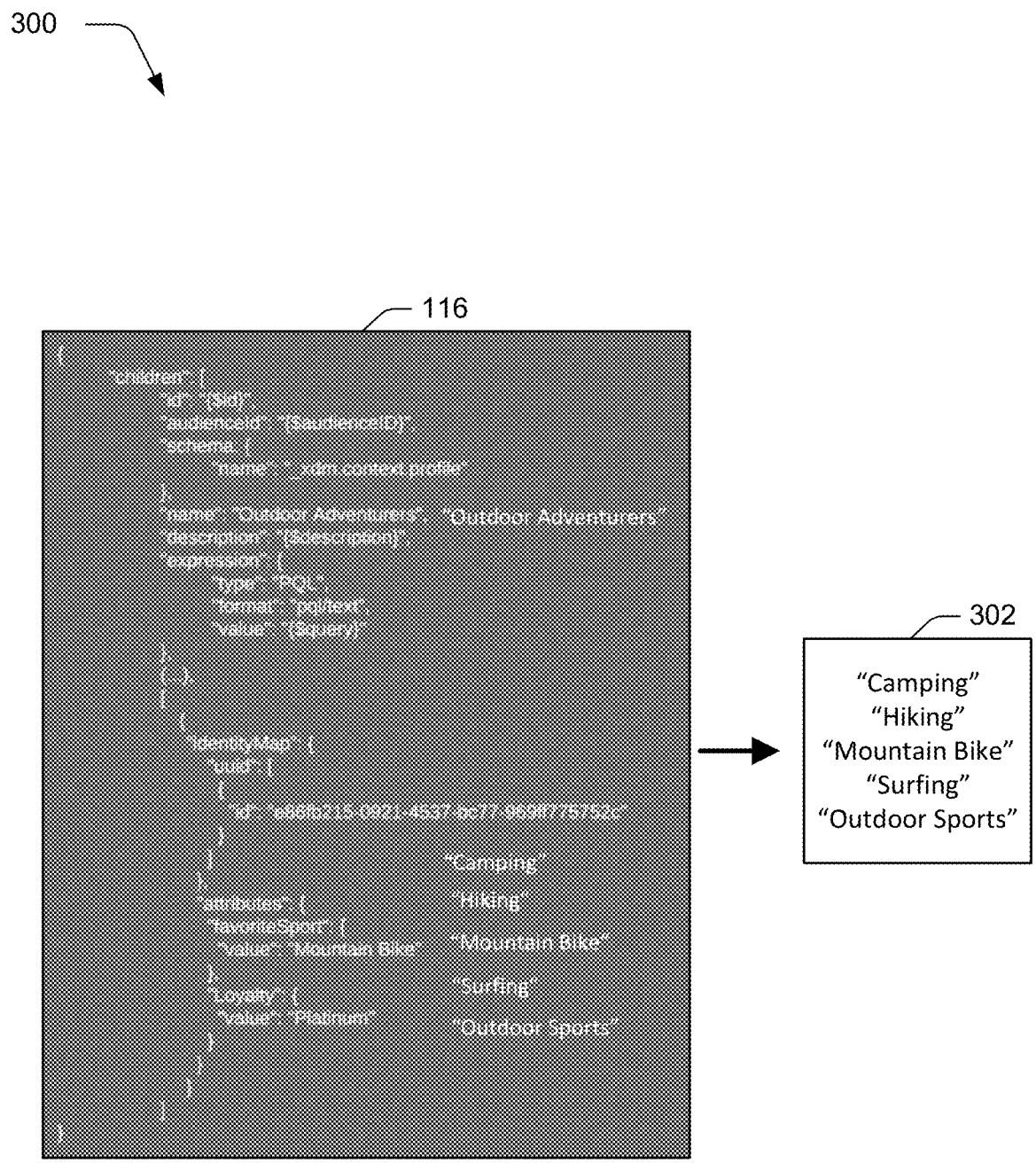
FIG. 3 illustrates a representation of extracting keywords that are associated with attributes of an entity segment based on input data.

FIG. 3 illustrates a representation 300 of extracting keywords that are associated with attributes of an entity segment based on input data 114. As shown, the representation 300 includes the JSON file 116 that indicates the attributes of the entity segment named "Outdoor Adventurers." The classification module 202 processes the input data 114 to extract keywords 302 from the JSON file 116 that are associated with the attributes of the entity segment named "Outdoor Adventurers." For example, the keywords 302 include "Camping," "Hiking," "Mountain Bike," "Surfing," and "Outdoor Sports."

In some examples, the keywords 302 are specified for the entity segment named "Outdoor Adventurers" as corresponding to attributes of entities included in the entity segment (e.g., by an analytics administrator). In these examples, the keywords 302 are customizable to remove keywords from the keywords 302 and/or to add additional keywords to the keywords 302. In an example, the keywords 302 are determined based on analytics data (e.g., interaction data) describing interactions of entities included in the entity segment named "Outdoor Adventurers." In this example, the keywords 302 are usable to infer intents of the entities included in the entity segment named "Outdoor Adventurers." These inferred intents are further leverage able to identify instances of digital content that are assigned content keywords which are semantically similar to the intents of the entities included in the entity segment named "Outdoor Adventurers" in one example.

The classification module 202 generates the keyword data 210 as describing the keywords 302. For instance, the extrapolation module 204 receives and processes the keyword data 210 and accesses the keyword corpus 112 in order to generate search data 212.

Figure 4:
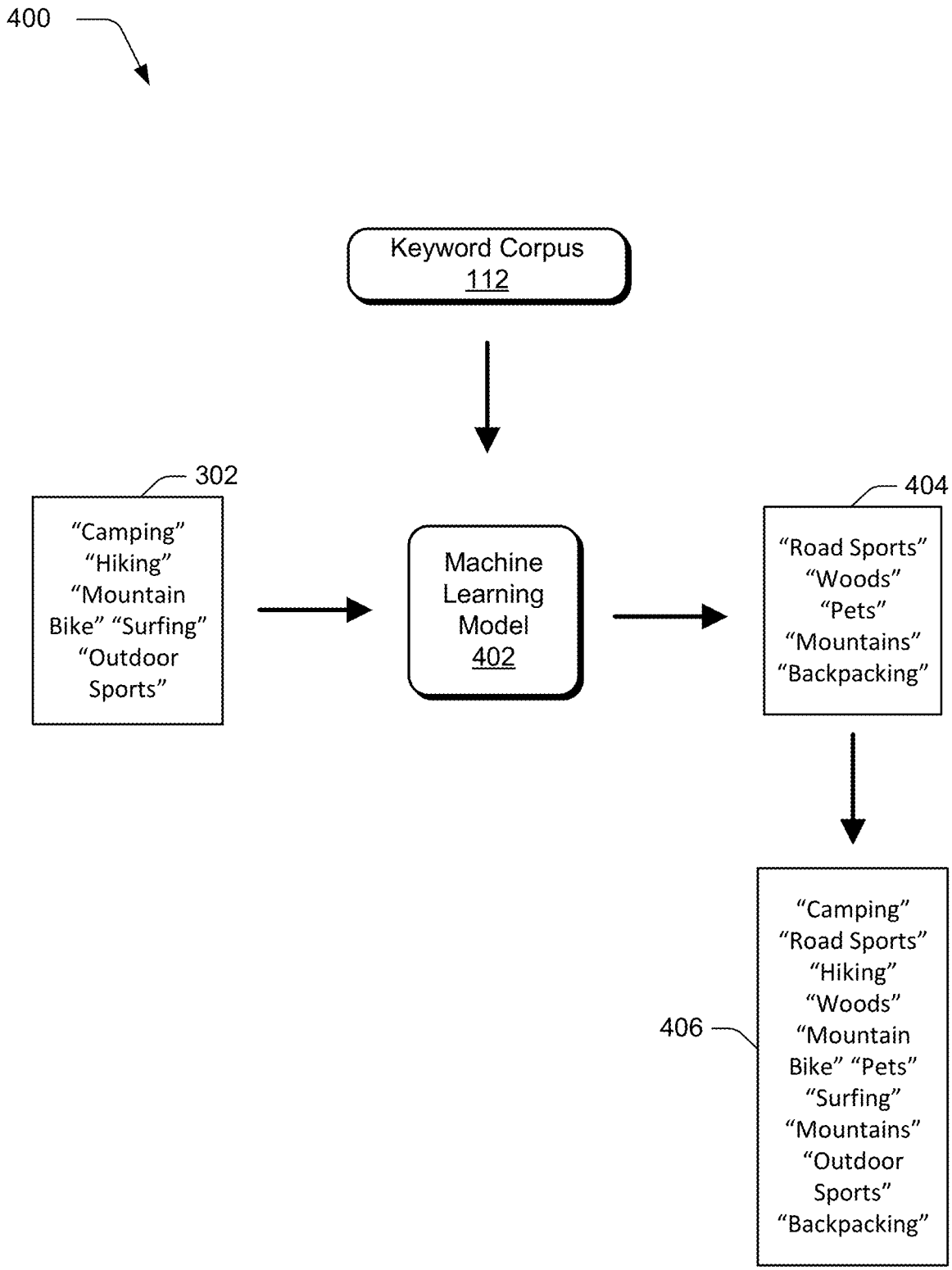
FIG. 4 illustrates a representation of determining additional keywords from a keyword corpus.

FIG. 4 illustrates a representation 400 of determining additional keywords from a keyword corpus 112. For example, the extrapolation module 204 includes or has access to a machine-learning model 402 which the extrapolation module 204 implements to determine additional keywords from the keyword corpus 112 that are semantically similar to the keywords 302. In one example, the machine-learning model 402 includes a natural language processing model and a naive Bayes classifier. In various examples, the natural language processing model includes a long-short term memory (LSTM) model, a bidirectional encoder representation from transformers model, a generative pretrained transformer model 3, and so forth. For instance, the extrapolation module 204 implements the machine-learning model 402 to generate numerical vector-based representations of the keywords 302 in a latent space by processing the keyword data 210.

In a first example, the extrapolation module 204 also utilizes the machine-learning model 402 to compute numerical vector-based representations of the keywords included in the keyword corpus 112. In a second example, the extrapolation module 204 precomputes vector representations of the keywords included in the keyword corpus 112 using the machine-learning model 402. In both examples, the extrapolation module 204 compares the vector-based representations of the keywords 302 with vector-based representations of the keywords in the keyword corpus 112 to determine additional keywords 404 from the keyword corpus 112 that are semantically similar to the keywords 302.

For example, the additional keywords 404 include "Road Sports," "Woods," "Pets," "Mountains," and "Backpacking." As shown in FIG. 4, the extrapolation module 204 compiles a set of matchable keywords 406 that includes the keywords 302 and the additional keywords 404. The extrapolation module 204 generates the search data 212 as describing the set of matchable keywords 406. For instance, the match module 206 receives and processes the search data 212 and accesses the content repository 118 in order to generate content data 214.

Figure 5:
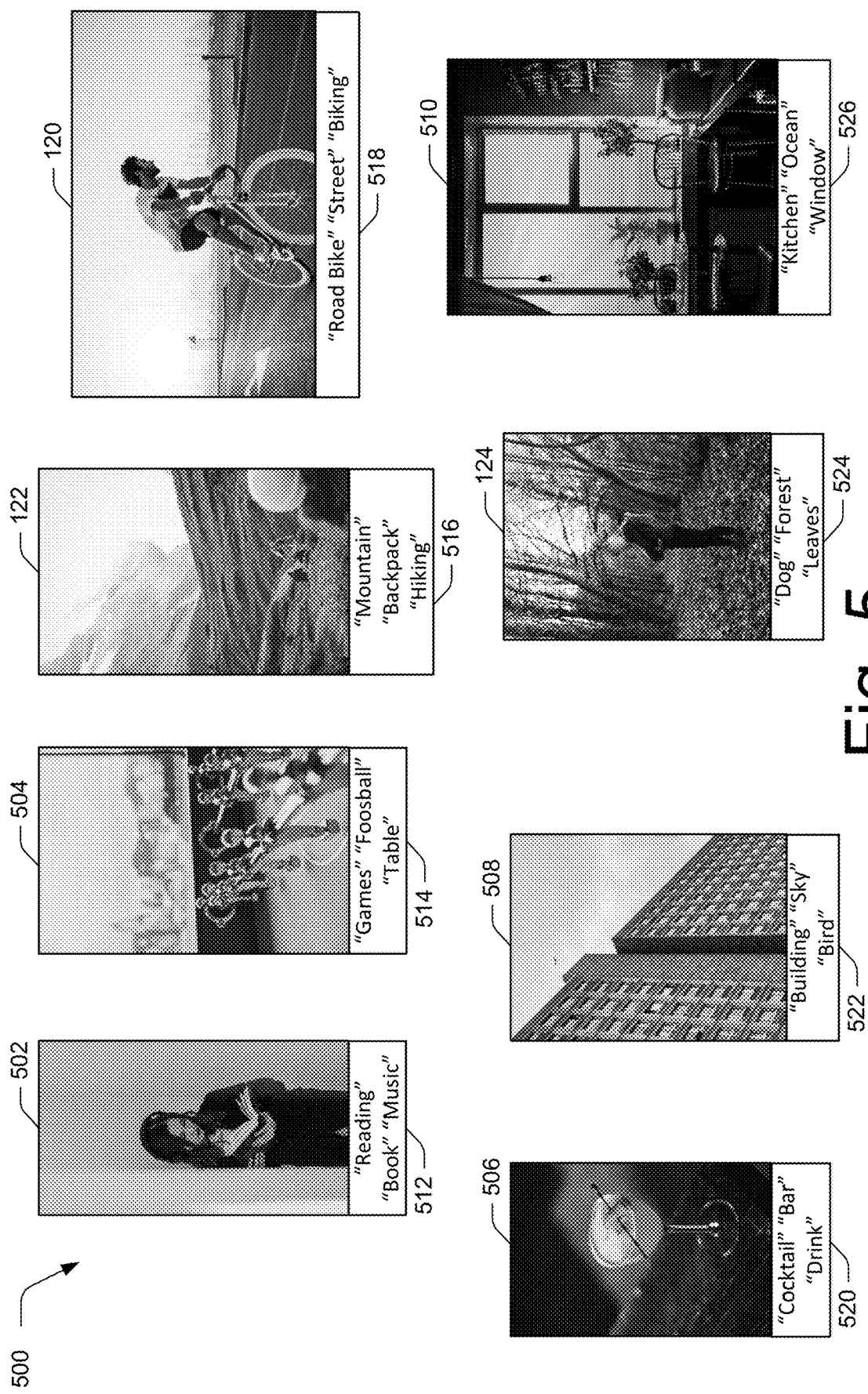
FIG. 5 illustrates a representation of identifying candidate instances of digital content from a content repository.

FIG. 5 illustrates a representation 500 of identifying candidate instances of digital content from a content repository 118. The representation 500 includes the indications 120-122 of the instances of digital content as well as indications 502-510 of candidate instances of digital content which are identified from the content repository 118. For example, the indication 120 is the digital image depicting the person riding the road bike on the street; the indication 122 is a digital image depicting the people backpacking in the mountainous region; and the indication 124 is the digital image depicting the person holding the dog in the wooded area.

As shown, indication 502 is a digital image depicting a person reading; indication 504 is a digital image depicting a portion of a foosball table; indication 506 is a digital image depicting a drink on a bar; indication 508 is a digital image depicting a side of a building; and indication 510 is a digital image depicting a view of an ocean through a window of a kitchen. The match module 206 leverages the search data 212 describing the set of matchable keywords 406 in order to compute match scores for each of the indications 120-122, 502-510. In order to compute the match score for the indication 502, for instance, the match module 206 accesses content keywords 512 assigned to the digital image depicting the person reading.

For example, the content keywords 512 are assigned to the digital image depicting the person reading by an additional machine-learning model trained on training data to assign content keywords to instances of digital content. The match module 206 determines an amount of semantic overlap between keywords included in the set of matchable keywords 406 "Camping," "Road Sports," "Hiking," "Woods," "Mountain Bike," "Pets," "Surfing," "Mountains," "Outdoor Sports," "Backpacking" and the content keywords 512 "Reading," "Book," "Music." In one example, the match module 206 determines amounts of semantic overlap between the set of matchable keywords 406 and sets of content keywords using the machine-learning model 402. In another example, the match module 206 determines amounts of semantic overlap between the set of matchable keywords 406 and sets of content keywords using an additional machine-learning model trained on training data to generate match scores for sets of matchable keywords and sets of content keywords. For instance, the match module 206 determines a relatively small amount of semantic overlap between the set of matchable keywords 406 and the content keywords 512. As a result, the match module 206 generates a relatively low match score (e.g., 0.22 or 22 percent) for the indication 502 of the candidate instance of digital content that is the digital image depicting the person reading.

The match module 206 computes a match score for the indication 504 using content keywords 514 assigned to the digital image depicting the portion of the foosball table. In an example, the match module 206 determines the content keywords 514 "Games," "Foosball," "Table" have a relatively small amount of semantic overlap with the set of matchable keywords 406. Based on this determination, the match module 206 generates a relatively low match score (e.g., 0.21 or 21 percent) for the indication 504.

In one example, the match module 206 determines an amount of semantic overlap between the set of matchable keywords 406 and content keywords 516 assigned to the digital image depicting the people hiking in the mountainous region. As shown, the content keywords 516 include "Mountain," "Backpack," "Hiking," and the match module 206 determines a relatively large amount of semantic overlap between the set of matchable keywords 406 and the content keywords 516. Accordingly, the match module 206 generates a relatively high match score (e.g., 0.87 or 87 percent) for the indication 122.

For example, the match module 206 determines an amount of semantic overlap between the set of matchable keywords 406 and content keywords 518 assigned to the digital image depicting the person riding the road bike on the street. The content keywords 518 include "Road Bike," "Street," "Biking," and the match module 206 determines a relatively large amount of semantic overlap between the content keywords 518 and the set of matchable keywords 406. Thus, the match module 206 generates a relatively high match score (e.g., 0.88 or 88 percent) for the indication 120.

In one example, the match module 206 determines a relatively small amount of semantic overlap between the set of matchable keywords 406 and content keywords 520 assigned to the digital image depicting the drink on the bar. For instance, the content keywords 520 include "Cocktail," "Bar," "Drink." Based on the relatively small amount of semantic overlap, the match module 206 generates a relatively low match score (e.g., 0.18 or 18 percent) for the indication 506.

In another example, the match module 206 determines an amount of semantic overlap between the set of matchable keywords 406 and content keywords 522 assigned to the digital image depicting the building. In this example, the content keywords 522 include "Building," "Sky," "Bird," and the match module 206 determines a relatively small amount of semantic overlap between the content keywords 522 and the set of matchable keywords 406. Therefore, the match module 206 generates a relatively low match score (e.g., 0.23 or 23 percent) for the indication 508.

The match module 206 determines an amount of semantic overlap between the set of matchable keywords 406 and content keywords 524 assigned to the digital image depicting the person holding the dog in the wooded area. For instance, the content keywords 524 include "Dog," "Forest," "Leaves," and the match module 206 determines a relatively large amount of semantic overlap between the set of matchable keywords 406 and the content keywords 524. Accordingly, the match module 206 generates a relatively high match score (e.g., 0.85 or 85 percent) for the indication 124.

In an example, the match module 206 determines an amount of semantic overlap between the set of matchable keywords 406 and content keywords 526 assigned to the digital image depicting the view of the ocean through the window of the kitchen. In this example, the content keywords 526 include "Kitchen," "Ocean," "Window," and the match module 206 determines a relatively small amount of semantic overlap between the content keywords 526 and the set of matchable keywords 406. Based on this determination, the match module 206 generates a relatively low match score (e.g., 0.17 or 17 percent) for the indication 510.

For example, the match module 206 selects the indication 120, the indication 122, and the indication 124 as having the relatively high match scores with respect to the set of matchable keywords 406. In this example, the match module 206 generates the content data 214 as describing the indications 120, 122, 124 and the match scores for each of the indications 120, 122, 124. For instance, the display module 208 receives and processes the content data 214 to display the indications 120, 122, 124 in the user interface 126 of the display device 106. In some examples, when the display module 208 receives and processes the content data 214, the display module 208 causes the indications 120, 122, 124 to be displayed in the user interface 126 in an order based on the match scores for the indications 120, 122, 124 such that one of the indications 120-124 having the highest match score is displayed first in the order. In these examples, the display module 208 displays one of the indications 120-124 having the next highest match score second in the order, and the display module 208 displays one of the indications 120-124 having the lowest match score third in the order.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable individually, together, and/or combined in different ways. Thus, individual functionality, features, and concepts described in relation to different example environments, devices, components, figures, and procedures herein are usable in any suitable combinations and are not limited to the particular combinations represented by the enumerated examples in this description.

Example Procedures

Figure 6:
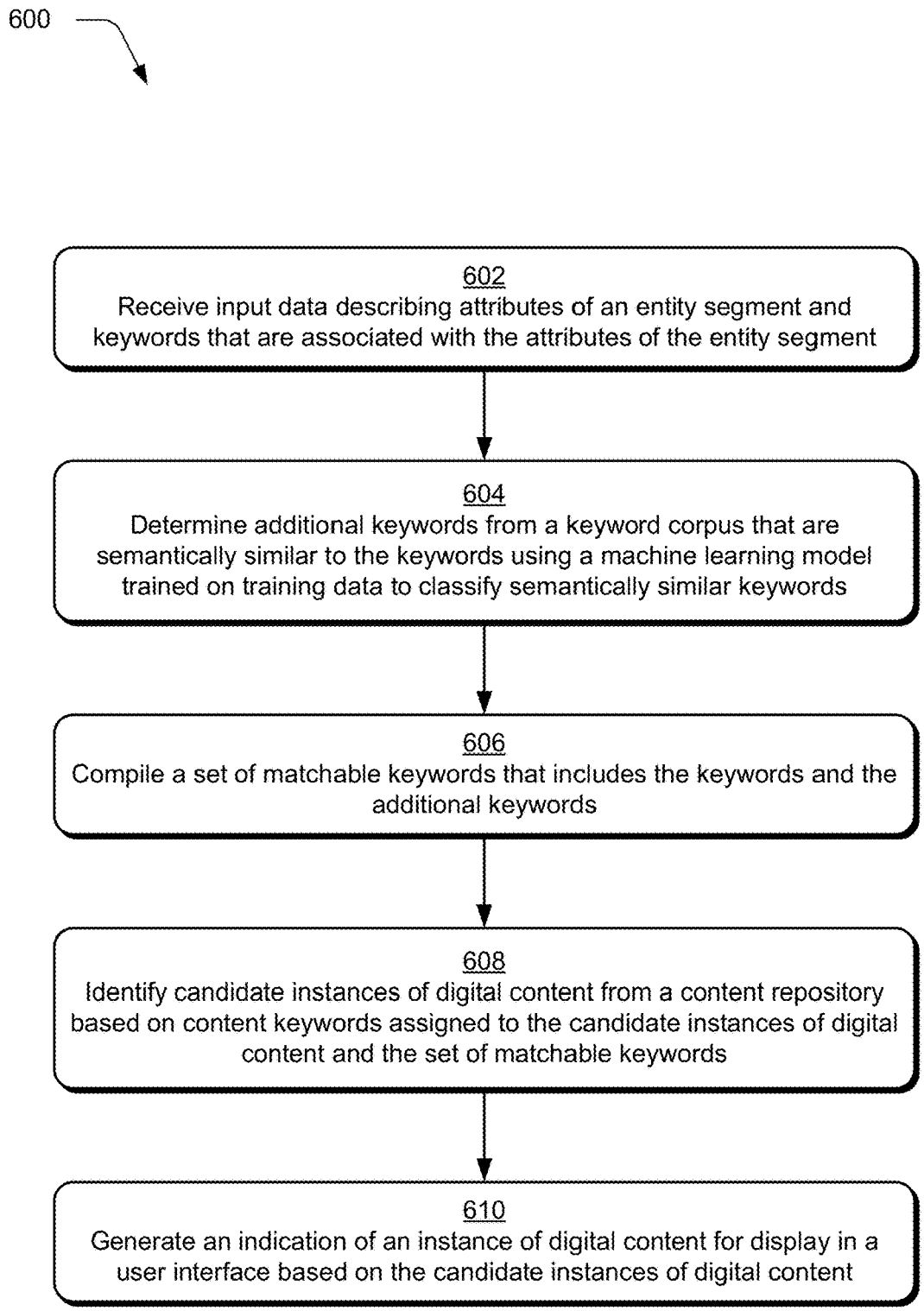
FIG. 6 is a flow diagram depicting a procedure in an example implementation in which an indication of an instance of digital content is generated for display in a user interface based on candidate instances of digital content.

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-5. FIG. 6 is a flow diagram depicting a procedure 600 in an example implementation in which an indication of an instance of digital content is generated for display in a user interface based on candidate instances of digital content.

Input data is received describing attributes of an entity segment and keywords that are associated with the attributes of the entity segment (block 602). For example, the computing device 102 implements the content module 110 to receive the input data. Additional keywords are determined from a keyword corpus that are semantically similar to the keywords using a machine-learning model trained on training data to classify semantically similar keywords (block 604). In one example, the content module 110 determines the additional keywords.

A set of matchable keywords is compiled that includes the keywords and the additional keywords (block 606). In an example, the content module 110 compiles the set of matchable keywords. Candidate instances of digital content are identified from a content repository based on content keywords assigned to the candidate instances of digital content and the set of matchable keywords (block 608). For example, the content module 110 identifies the candidate instances of digital content from the content repository. An indication of an instance of digital content is generated for display in a user interface based on the candidate instances of digital content (block 610). In some examples, the content module 110 generates the indication of the instance of digital content for display in the user interface.

Figure 7:
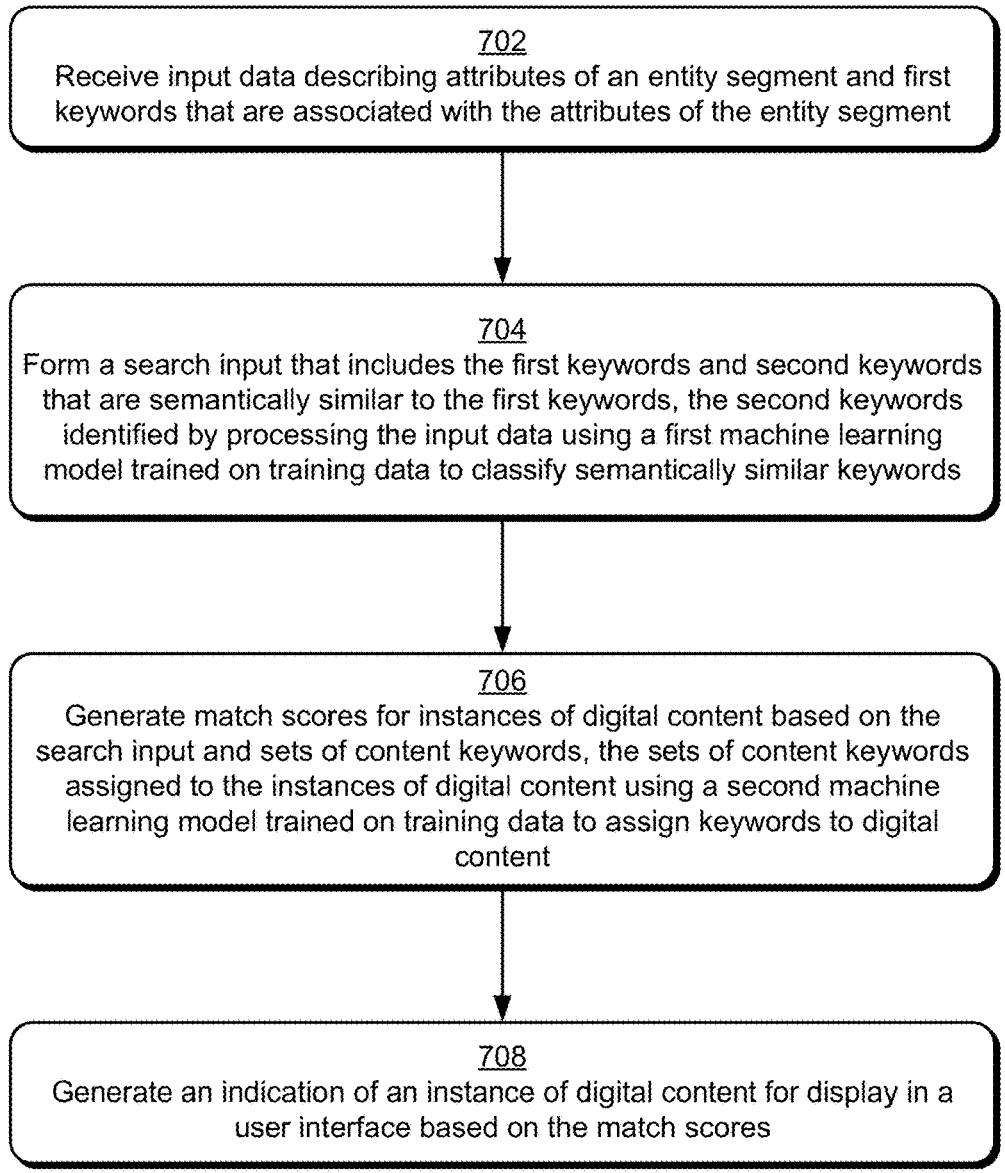
FIG. 7 is a flow diagram depicting a procedure in an example implementation in which an indication of an instance of digital content is generated for display in a user interface based on match scores.

FIG. 7 is a flow diagram depicting a procedure 700 in an example implementation in which an indication of an instance of digital content is generated for display in a user interface based on match scores. Input data is received describing attributes of an entity segment and first keywords that are associated with the attributes of the entity segment (block 702). For example, the computing device 102 implements the content module 110 to receive the input data. A search input is formed that includes the first keywords and second keywords that are semantically similar to the first keywords, the second keywords identified by processing the input data using a first machine-learning model trained on training data to classify semantically similar keywords (block 704). In one example, the content module 110 forms the search input using the first machine-learning model.

Match scores are generated for instances of digital content based on the search input and sets of content keywords, the sets of content keywords assigned to the instances of digital content using a second machine-learning model trained on training data to assign keywords to digital content (block 706). In some examples, the content module 110 generates the match scores for the instances of digital content. An indication of an instance of digital content is generated for display in a user interface based on the match scores (block 708). In an example, the content module 110 generates the indication of the instance of digital content for display in the user interface.

Figure 8A:
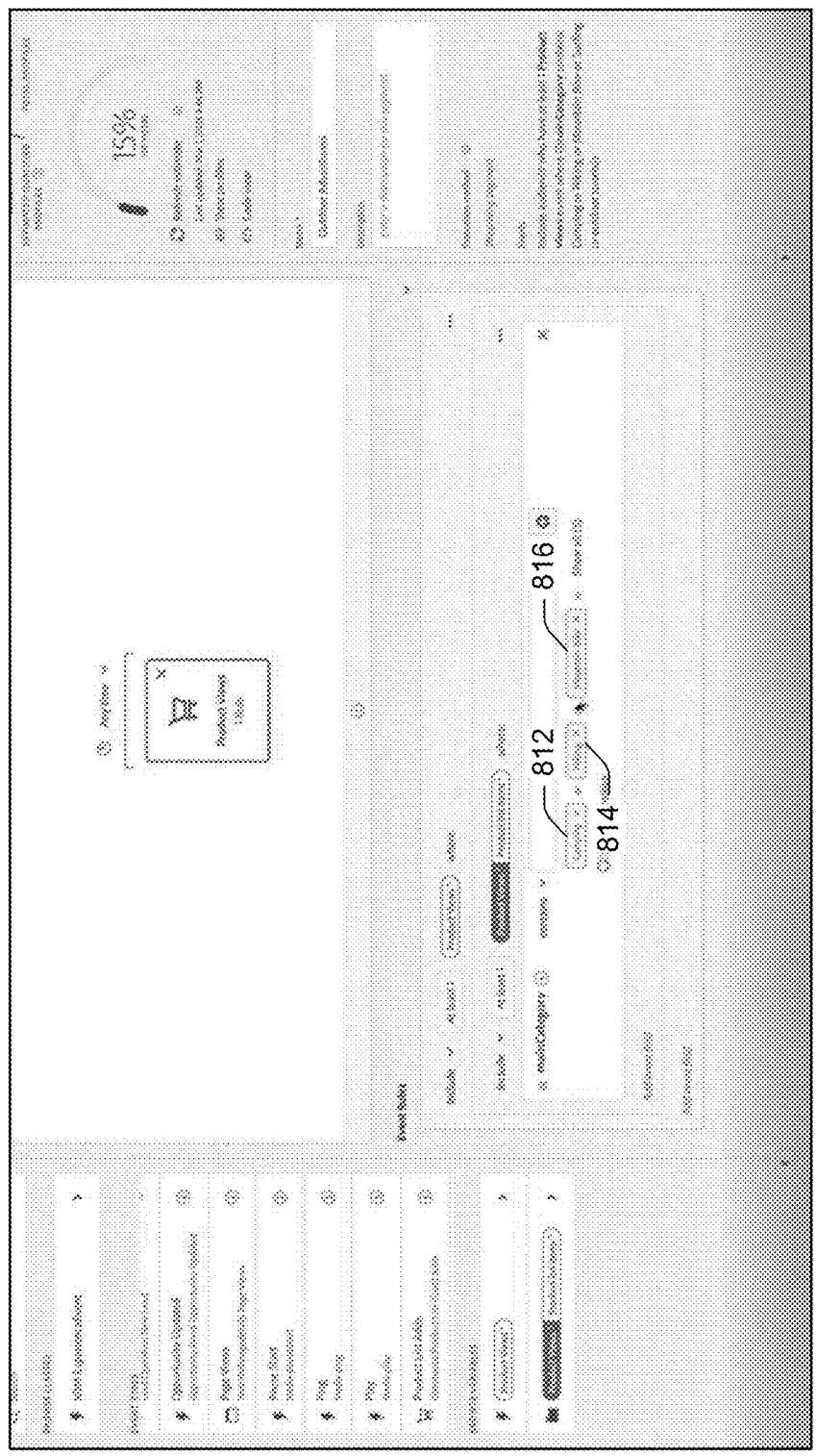
FIGS. 8A, 8B, 8C, 8D, 8E, and 8F illustrate examples of user interfaces for identifying instances of digital content.
Figure 8B:
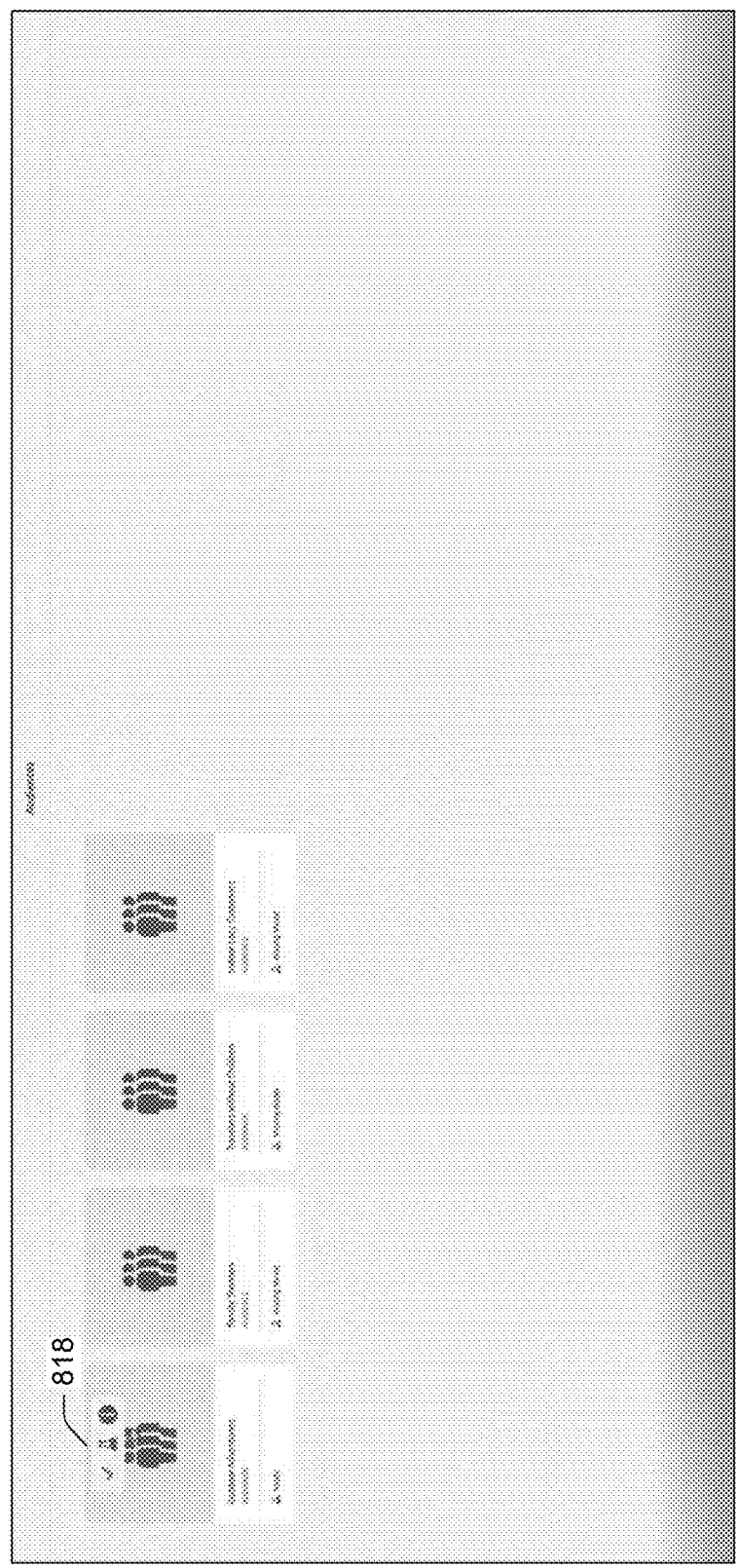
Figure 8C:
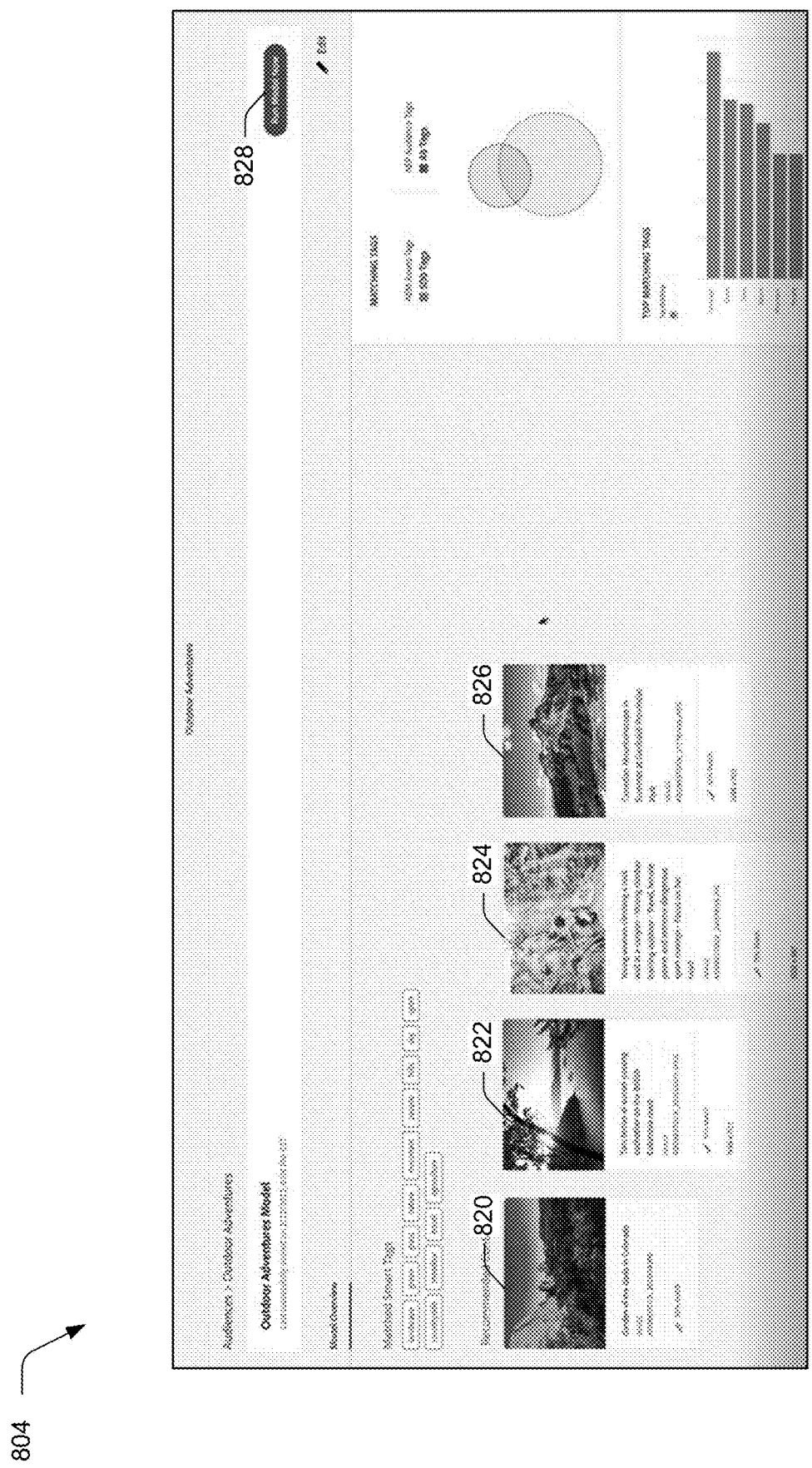
Figure 8D:
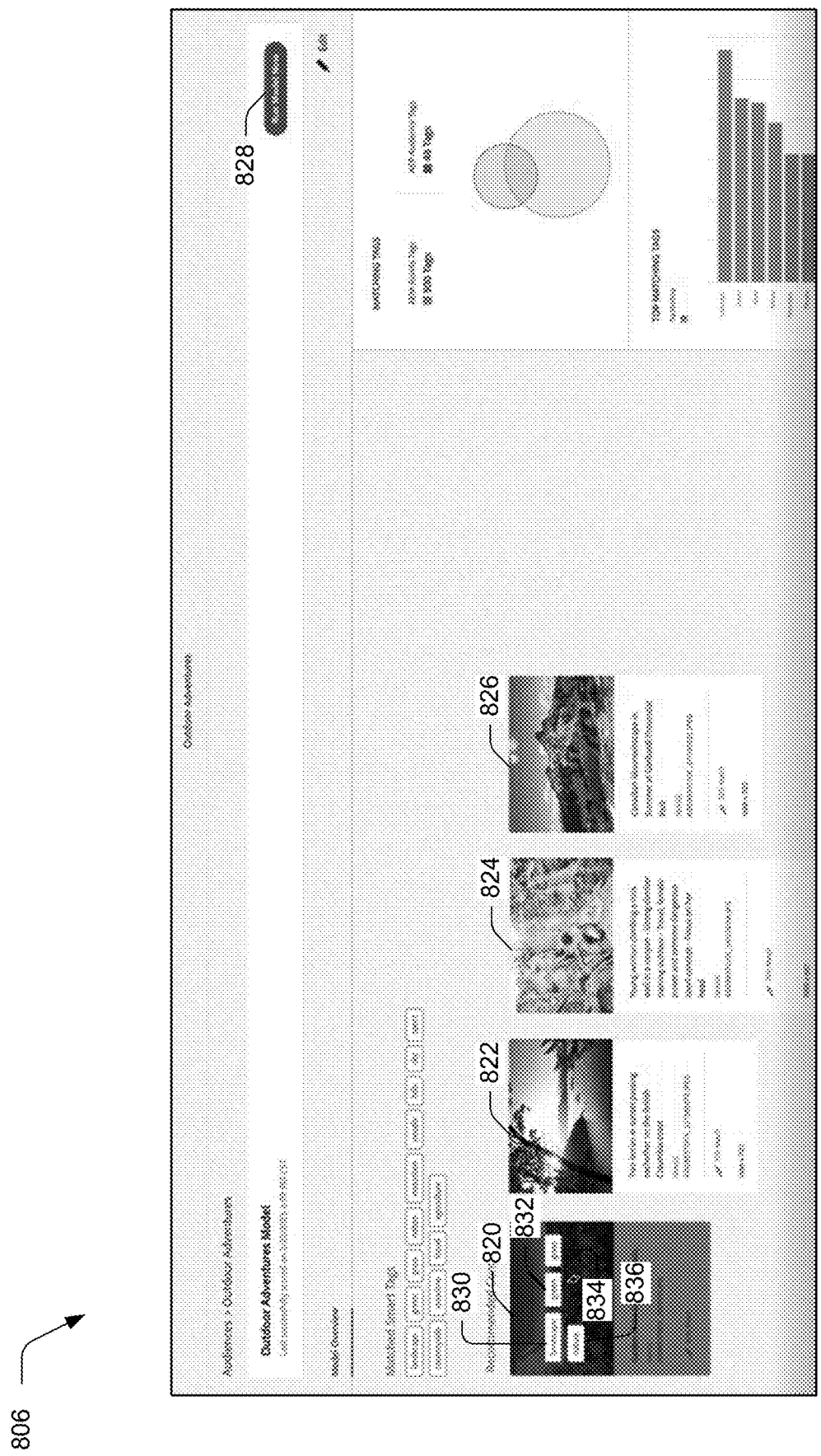
Figure 8E:
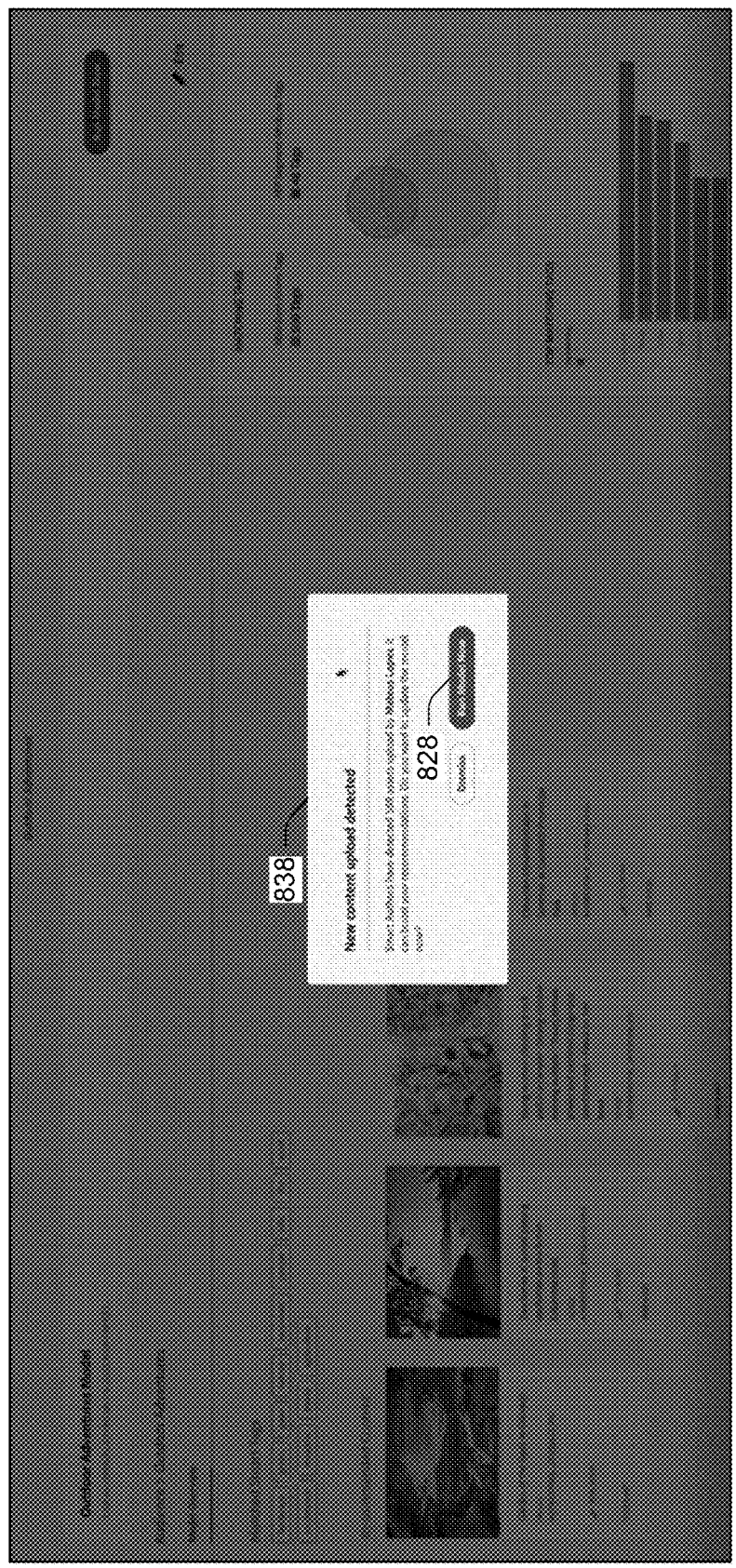
Figure 8F:
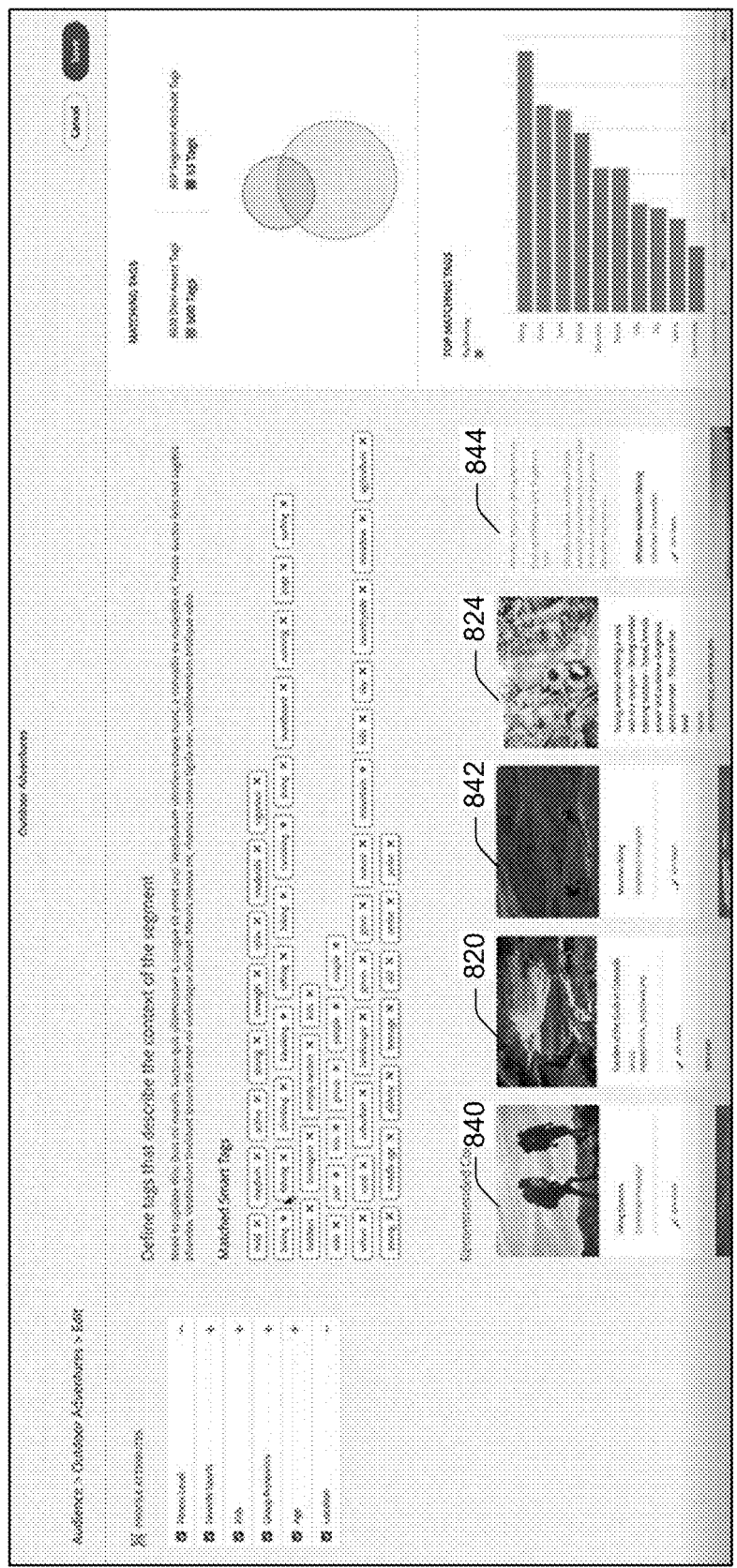

FIGS. 8A, 8B, 8C, 8D, 8E, and 8F illustrate examples of user interfaces for identifying instances of digital content. FIG. 8A illustrates a representation 800 of assigning keywords to an entity segment. FIG. 8B illustrates a representation 802 of identifying instances of digital content for an entity segment. FIG. 8C illustrates a representation 804 of identified instances of digital content. FIG. 8D illustrates a representation 806 of content keywords assigned to an instance of digital content. FIG. 8E illustrates a representation 808 of modifying instances of digital content included in the content repository 118 by adding instances of digital content to the content repository 118. FIG. 8F illustrates a representation 810 of identifying additional instances of digital content for an entity segment.

With reference to FIG. 8A, a user interacts with an input device (e.g., a mouse, a keyboard, a stylus, a microphone, a touchscreen, etc.) relative to a user interface depicted in the representation 800 to specify keywords for attributes of the entity segment named "Outdoor Adventurers." As shown, the user assigns the entity segment named "Outdoor Adventurers" keywords including "Camping" 812, "Hiking" 814, and "Mountain Bike" 816. Although the representation 800 illustrates an example in which page categories are used to define features of entities associated with "Outdoor Adventures," it is to be appreciated that in other examples, any available/definable attributes are assignable to the entity segment named "Outdoor Adventurers." For example, it is possible to assign any natural language keyword or keywords to the entity segment named "Outdoor Adventurers." With reference to FIG. 8B, the user interacts with the input device to select an indication 818 of the entity segment named "Outdoor Adventurers" to identify instances of digital content based on the keywords including "Camping" 812, "Hiking" 814, and "Mountain Bike" 816. As shown in FIG. 8C, the content module 110 identifies instances of digital content 820, 822, 824, 826 for the entity segment named "Outdoor Adventurers."

In the illustrated example, each of the instances of digital content 820-826 is a digital image. Textual elements illustrated below the instances of digital content 820-826 are also instances of digital content such as content fragments in one example. In other examples, the instances of digital content 820-826 are digital videos, content fragments, experience fragments, and so forth. The representation 804 also includes a user interface element 828 which if selected by the user via manipulation of the input device causes the content module 110 to identify additional instances of digital content. For example, content module 110 identifies additional instances of digital content based on a user input that modifies the attributes of the entity segment associated with the keywords including "Camping" 812, "Hiking" 814, and "Mountain Bike" 816; a user input modifying a set of matchable keywords including "Camping" 812, "Hiking" 814, and "Mountain Bike" 816; and/or based on an addition of an additional instance of digital content to the content repository 118.

As illustrated in FIG. 8D, the user interacts with the input device to select instance of digital content 820 which causes the content module 110 to display content keywords assigned to the instance of digital content 820. For example, the content keywords include "landscape" 830, "green" 832, "grass" 834, and "nature" 836. In the representation 808 of FIG. 8E, an indication 838 is displayed conveying that additional instances of digital content have been added to the content repository 118. For example, the user interacts with the input device to select the user interface element 828. In response to the selection of the user interface element, the content module 110 identifies additional instances of digital content.

The representation 810 of FIG. 8F includes additional instances of digital content 840-844. For example, instance of digital content 840 is an experience fragment; instance of digital content 842 is an experience fragment; and instance of digital content 844 is a content fragment. By leveraging the keywords including "Camping" 812, "Hiking" 814, and "Mountain Bike" 816, the content module 110 identifies the additional instances of digital content 840-844 automatically which is not possible in conventional systems that are limited to manually searching for digital images using keyword searches.

Generative Artificial Intelligence Assistant

Figure 9:
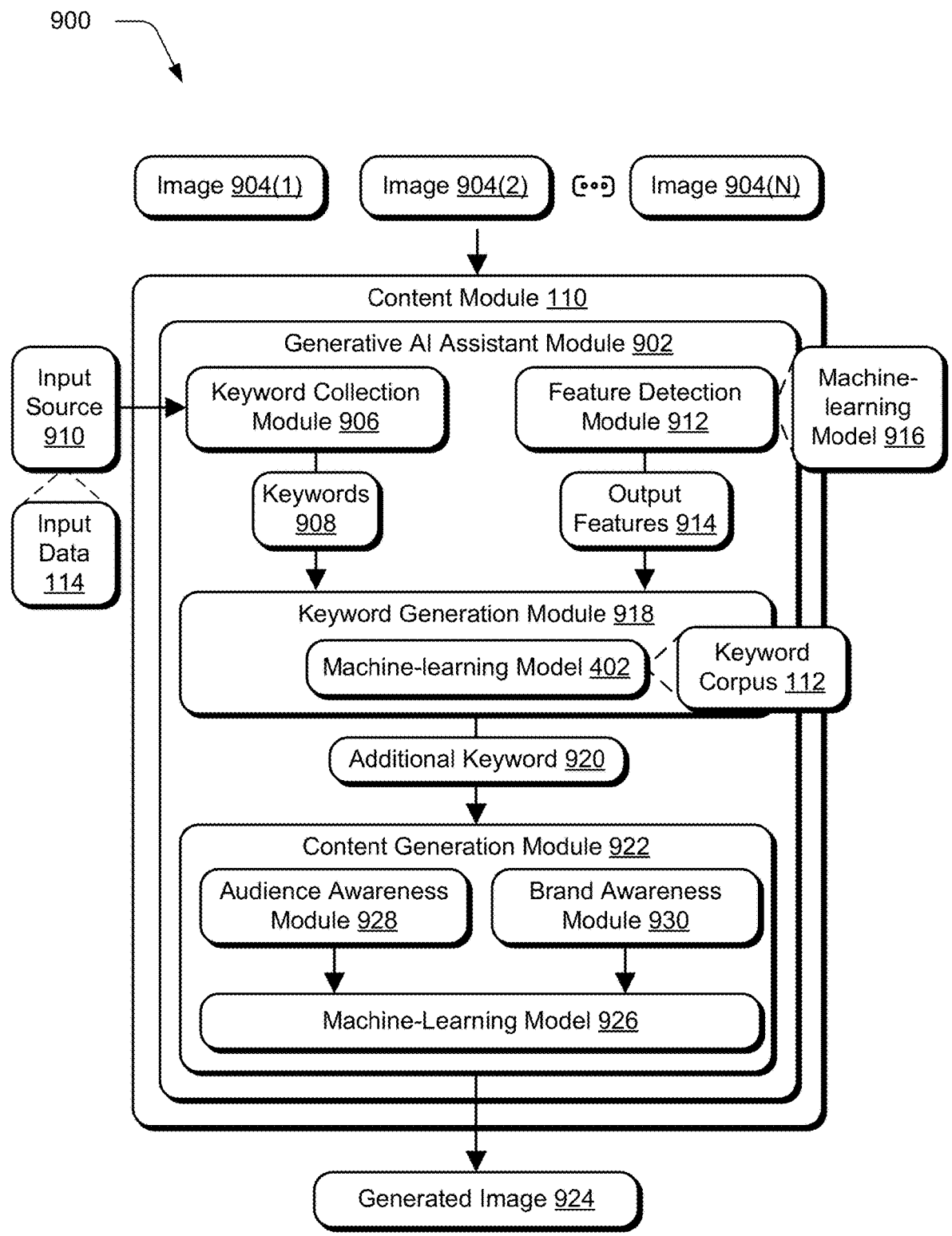
FIG. 9 depicts a system in an example implementation showing operation of a content module of FIG. 1 in greater detail as employing a generative artificial intelligence assistant to assist generation of digital content based on text associated with instances of digital content.

FIG. 9 depicts a system 900 in an example implementation showing operation of the content module 110 of FIG. 1 in greater detail as employing a generative artificial intelligence assistant to assist generation of digital content based on text associated with instances of digital content. A generative artificial intelligence (AI) assistant is implemented in this example that is configured to leverage the previously described keyword functionality of the instance identification techniques described above for content generation. Functionality to do so is illustrated as a generative AI assistant module 902 which is usable to generate an instance of digital content in a variety of ways. Although in image is described in the following examples other digital content configurations are also applicable as further described above.

The generative AI assistant module 902, for instance, is configured to receive a plurality of images, examples of which are illustrated as images 904(1), 904(2), . . . , 904(N). A keyword collection module 906 is then utilized by the generative AI assistant module 902 to extract keywords 908 from the images, e.g., as tags associated with the images 904(1)-904(N). The keywords 908, in a first example, are maintained as part of metadata associated with the images as described above and describe characteristics of the images 904(1)-904(N).

In a second example, the keyword collection module 906 is also configurable to obtain keywords 908 from an input source 910, e.g., keyword corpus 112. As previously described for the input data 114 above, for instance, the input data 114 is received from the input source 910 that describes a JavaScript Open Notation ("JSON") file. The file indicates characteristics of an entity segment that are associated with the attributes of the entity segment. In an example, the entity segment is named "Outdoor Adventurers" in the JSON file, and the keyword collection module 906 processes the input data 114 to extract the keywords 908 as including "Camping," "Hiking," "Mountain Bike," "Surfing," and "Outdoor Sports" as keywords 908 in this example.

The generative AI assistant module 902 is also configurable to detect features directly from the digital content, itself. The generative AI assistant module 902, for instance, includes a feature detection module 912 to is configured to output features 914 (e.g., as keywords also) extracted from the digital content using a machine-learning module 916. For example, the machine-learning module 916 is configurable as a classifier implemented by a convolutional neural network that determines a probability that a respective image 904(1)-904(N) includes or does not include a particular class, e.g., object, semantic notion, exhibits an emotion, and so forth. The class is then used as a keyword to describe characteristics of the digital content.

A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. In this example, the machine-learning module 916 is trained as a classifier in this example to identify whether corresponding images include or do not include a respective class. Examples of machine-learning models include neural networks, convolutional neural networks (CNNs), long short-term memory (LSTM) neural networks, decision trees, and so forth.

A keyword generation module 918 is then utilized to generate keywords 920 based on the keywords 908, the output features 914 (e.g., which may also be configured as keywords), and so on. To do so, the keyword generation module 918 leverages a machine-learning model 402 as previously described. In one example, the machine-learning model 402 includes a natural language processing model and a naive Bayes classifier. In various examples, the natural language processing model includes a long-short term memory (LSTM) model, a bidirectional encoder representations from transformers model, a generative pre-trained transformer model, and so forth. For instance, the machine-learning model 402 is configured to extract features from the keywords 908 to generate numerical vector-based representations of the keywords 908 in a latent space.

The keyword generation module 918 compares the vector-based representations of the tags with vector-based representations of the keywords in a keyword corpus to identify an additional keyword 920 from the keyword corpus 112. The additional keyword 920 is therefore semantically similar to keywords 908 received from the keyword collection module 906, e.g., through comparison of vector representations.

The generative AI assistant module 902 also includes a content generation module 922 that is configured to generate digital content (e.g., a generated digital image 924) using a machine-learning model 926. The machine-learning model 926, for instance, accepts a representation of keywords as a vector that captures semantics and syntax of the keywords. The representation of the keywords is then used as a condition to guide the machine-learning model 926 configured as a conditional generative adversarial network (GAN) to guide image generation. A GAN is trained using a generator/discriminator architecture in which the generator is trying to fool the discriminator. Once trained, the generator is then utilized as the machine-learning model 926 to generate the generated digital image 924 as further described in relation to FIGS. 12-13.

The machine-learning model 926 is also configurable to support content mixing. In this example, text prompts from selected images act as "ingredients" to generate new variations of content from remixed text prompts. Further discussion of context remixing is described in relation to FIGS. 14-16.

Figure 12:
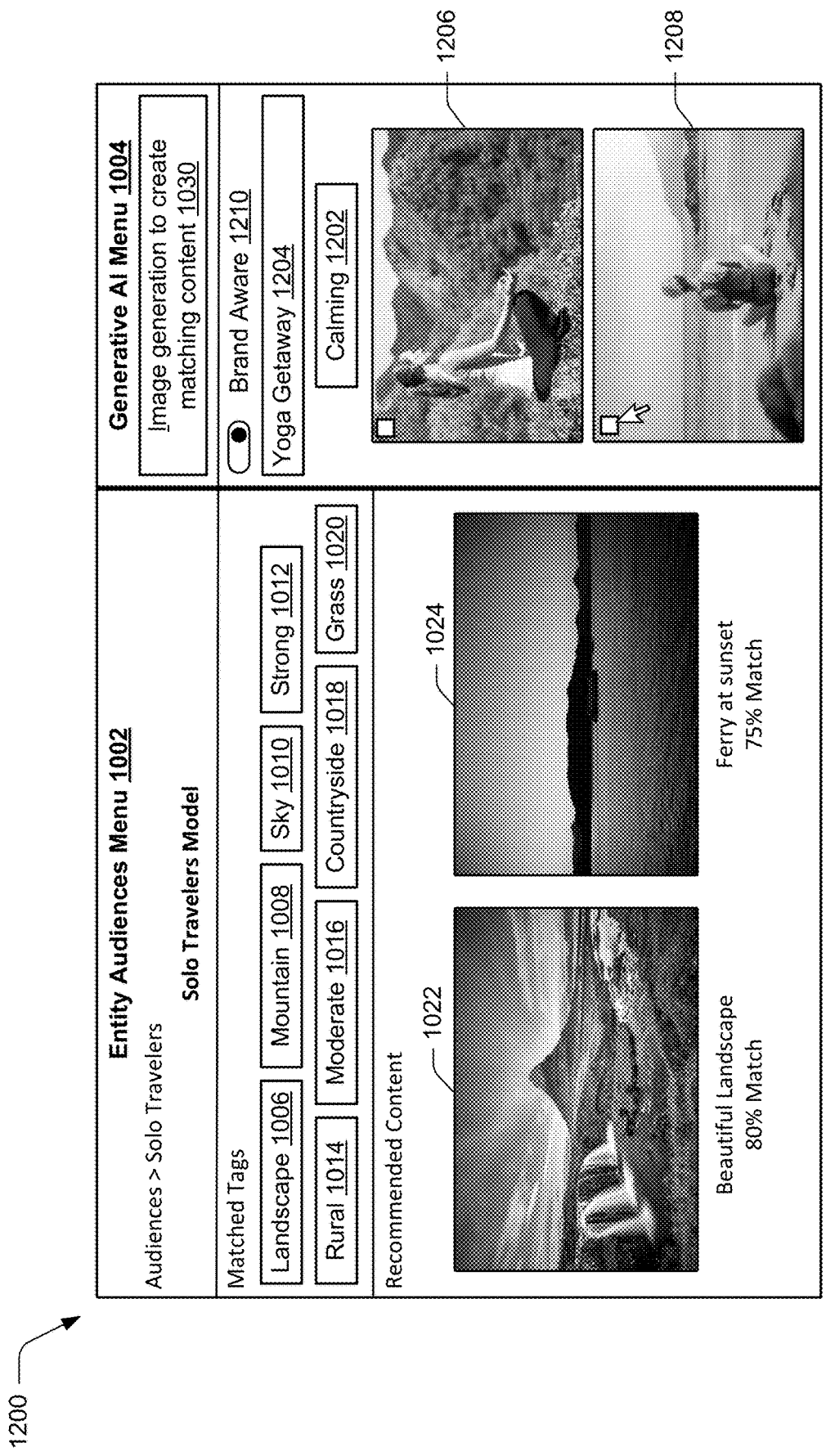
FIG. 12 depicts an example of a user interface configured to support a generative artificial intelligence (AI) assistant as part of image generation to create matching content.

The content generation module 922 is further configurable to support audience and brand awareness as part of generating the generated digital image 924, examples of functionality to do so include an audience awareness module 928 and a brand awareness module 930. The audience awareness module 928 supports attributes associated with a respective entity segment to promote content generation targeted towards that segment. The brand awareness module 930 is configured to be "brand aware" through training on digital content that is proprietary to a particular brand such that selection of an option as shown in FIG. 12 causes generation of the generated digital image 924 that is visually consistent with that brand, e.g., colors, fonts, shading, themes, and so forth.

Figure 10:
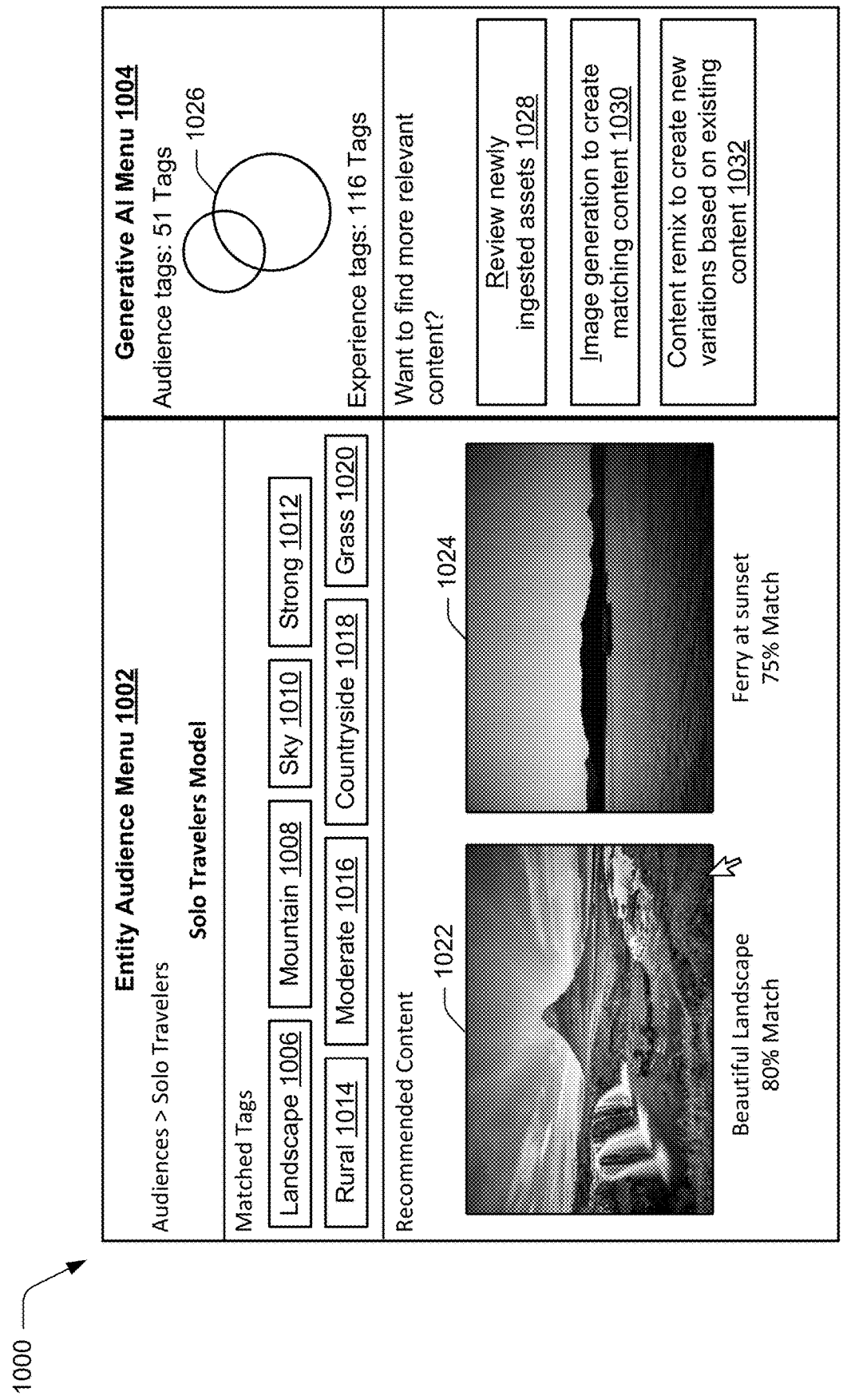
FIG. 10 depicts an example of a user interface configured to support a generative artificial intelligence (AI) assistant in support of generation of content by a generative AI assistant module.
Figure 11:
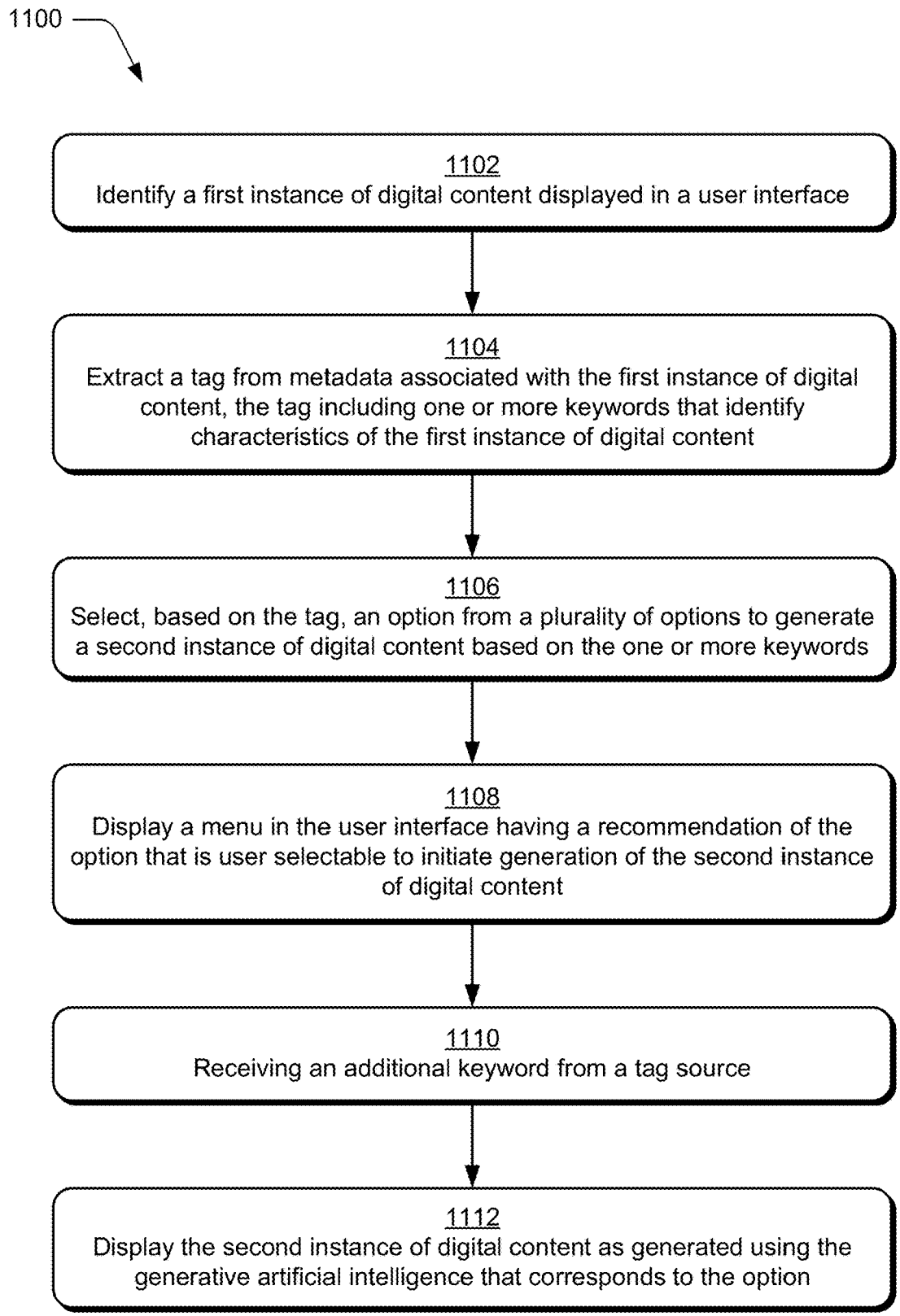
FIG. 11 is a flow diagram depicting a step-by-step procedure in an example implementation of operations performable by a processing device for accomplishing a result of content generation using a generative artificial intelligence (AI) assistant.

FIG. 10 depicts an example of a user interface 1000 configured to support a generative artificial intelligence (AI) assistant in support of generation of content by the generative AI assistant module 902. FIG. 11 is a flow diagram depicting a step-by-step procedure 1100 in an example implementation of operations performable by a processing device for accomplishing a result of content generation using a generative artificial intelligence (AI) assistant.

The user interface 1000 is configured to assist in generation of content targeted toward an entity segment, which is "solo travelers" in this example. To do so, the user interface 1000 includes an entity audience menu 1002 and a generative AI menu 1004, e.g., as a sidebar in the user interface 1000. The entity audience menu 1002 includes tags that are matched to this entity segment, examples of which include landscape 1006, mountain 1008, sky 1010, strong 1012, rural 1014, moderate 1016, countryside 1018, and grass 1020. The entity audience menu 1002 of the user interface 1000 also includes a first instance of digital content 1022 and a second instance of digital content 1024 with respective indications of an amount of "match" these instances have in relation to the tags, e.g., 80% and 75% respectively.

The generative AI menu 1004 of the user interface 1000 includes a Venn diagram 1026 depicting a relationship of audience tags and experience tags used in for the entity segment. Audience tags, for instance, are used to define entity membership in respective entity segments. The audience tags are used to track and collect data describing entity interaction with digital content. Accordingly, audience tags are used for managing entity segments, understanding entity interactions with digital content, and for control of digital content transmission to respective entities. Experience tags, on the other hand, are used to categorize and manage digital content as part of a content management solution, e.g., for building websites, mobile applications, forms, and so forth. Experience tags, for instance, are configurable to support hierarchical management and categorization of digital content in support of targeted search and content distribution.

The generative AI menu 1004 is configurable to support a variety of functionality that leverages keyword techniques as previously described as a guide towards content generative using generative AI. In the illustrated example, the generative AI assistant module 902 identifies a first instance of digital content 1022 displayed in a user interface (block 1102), e.g., as selected using a cursor control device as illustrated, gesture, spoken utterance, and so forth.

In response, a tag is extracted by a keyword collection module 906 from metadata associated with the first instance of digital content 1022. The tag includes one or more keywords 908 that identify characteristics of the first instance of digital content 1022 (block 1104), e.g., landscape 1006, sky 1010, rural 1014, grass 1020, and so forth.

The generative AI assistant module 902 then selects an option from a plurality of options to generate a second instance of digital content based on the one or more keywords (block 1106), e.g., a tag. The generative AI assistant module 902, for instance, bases the selection on characteristics of the digital content described by the tag (e.g., which keywords are included in the tag and then select a generative AI technique based on the keywords), type of the digital content identified by the tag (e.g., digital image, digital document), combinations of digital content selected (e.g., for content remix or generation of new digital content), and so forth.

Each of the plurality of options are configured, respectively, to use generative artificial intelligence as implemented by at least one machine-learning model. In the illustrated example, the generative AI menu 1004 includes options to review newly ingested assets 1028, initiate image generation to create matching content 1030, and initiate a content remix to create new variations based on existing content 1032. The option to review newly ingested assets 1028, for instance, is configurable similar to the indication 838 of FIG. 8E which is displayed conveying that additional instances of digital content have been added to the content repository 118.

The options to initiate image generation to create matching content 1030 and initiate a content remix to create new variations based on existing content 1032 are configured to leverage the content generation module 922 of the generative AI assistant module 902 to generate the generated digital image 924.

In this example, a menu (e.g., generative AI menu 1004) is displayed in the user interface (e.g., user interface 1000) having a recommendation of the option that is user selectable to initiate generation of the second instance of digital content (block 1108). The generative AI assistant module 902, for instance, is configured to obtain keywords 908 that are to be used as a basis by the content generation module 922 to generate the generated digital image 924.

Additionally, the content generation module 922 may also receive an additional keyword 920 from an input source (block 1110), e.g., the keyword generation module 918, the input source 910, and so on. The additional keyword 920, for instance, is selected based on semantic similarity to the keywords 908. Other inputs may also be used by the content generation module 922 in generating the generated digital image 924, examples of which include the output features 914 from the feature detection module 912, keywords describing an entity segment that is to receive the digital content, keywords relating to brand awareness, and so forth.

The content generation module 922, through use of the machine-learning model 926, is then tasked with generating the generated digital image 924. The machine-learning model 926 is configurable to support a variety of inputs as part of implementing a variety of functionality, such as for image generation to create matching content 1030 as further described in relation to FIGS. 12-13 and content remix to create new variations based on existing content 1032 as further described in relation to FIGS. 14-16. Once generated, the second instance of digital content is displayed as generated using the generative artificial intelligence that corresponds to the option (block 1112). The second instance of digital content, for instance, is generated based on the additional keyword, keywords extracted from the images, keywords characterizing entity segments, brand aware, and so on as further described below. The second instance of digital content is displayable non-modally in the user interface 1000 (e.g., within the generative AI menu 1004) to increase user efficiency by no involving navigation away from the user interface 1000.

Figure 13:
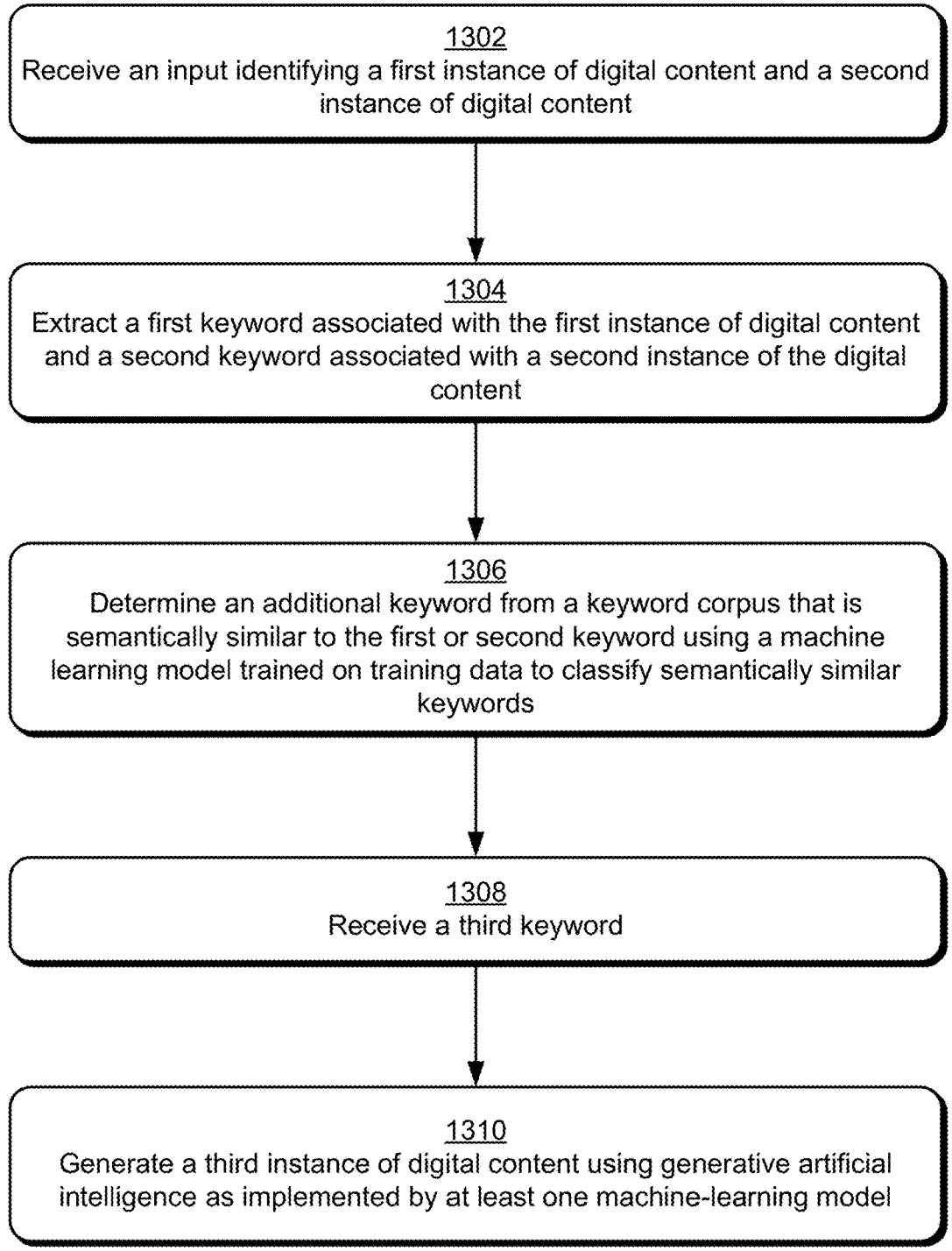
FIG. 13 is a flow diagram depicting a step-by-step procedure in an example implementation of operations performable by a processing device for accomplishing a result of image generation to create matching content using a generative artificial intelligence (AI) assistant.

FIG. 12 depicts an example of a user interface 1200 configured to support a generative artificial intelligence (AI) assistant as part of image generation to create matching content. FIG. 13 is a flow diagram depicting a step-by-step procedure 1300 in an example implementation of operations performable by a processing device for accomplishing a result of image generation to create matching content using a generative artificial intelligence (AI) assistant.

In this example, the generative AI menu 1004 is configured responsive to selection of the matching content 1030 option of FIG. 10. Accordingly, the generative AI assistant module 902 is tasked in this example of generating digital content using based on selection of other items of digital content. Further, the generation of the digital content is performed independently of the selected digital content, itself, but rather leverages keywords associated with the content. As such, the generated digital content overcomes potential restrictions in subsequent use of the selected digital content.

The generative AI assistant module 902, for instance, receives an input identifying a first instance of digital content 1022 and a second instance of digital content 1024 (block 1302), e.g., via the entity audience menu 1002 of the user interface 1000. As before, the first instance of digital content 1022 and the second instance of digital content 1024 are selectable in a variety of ways, including use of a cursor control device, gesture, and so forth. Use of a single instance and even additional instances (e.g., three or more) are also contemplated without departing from the spirit and scope of the described functionality.

In response, a first keyword associated with the first instance of digital content and a second keyword associated with a second instance of the digital content is extracted (block 1304). A keyword collection module 906, for instance, may extract the keywords 908 from metadata associated with the digital content, e.g., as tags. In another instance, the feature detection module 912 uses a machine-learning module 916 to generate the keywords, e.g., as a classifier. A variety of other instances are also contemplated.

A keyword generation module 918 is then used to generate an additional keyword 920 from a keyword corpus 112 that is semantically similar to the first or second keyword using a machine-learning model 402 trained on training data to classify semantically similar keywords (block 1306). The keyword generation module 918, for example, compares vectors generated from the keywords 908 and keyword corpus 112 in a latent space to determine a semantic relationship of the text to find corresponding keywords from a keyword corpus 112.

In an implementation, a third keyword is also received (block 1308). The third keyword, for instance, is receivable from input data 114 from an input source 910 that describes characteristics of an entity segment, e.g., that is a target of the digital content being generated.

A third instance of digital content is then generated (e.g., as generated digital image 924) by the content generation module 922 using generative artificial intelligence as implemented by at least one machine-learning model 926 (block 1310). The generation of the generated digital image 924 by the machine-learning model 926, for instance, is based on the additional keyword 920.

In the illustrated example of FIG. 12, for instance, the first instance of digital content 1022 and the second instance of digital content 1024 are selected, which have an 80% and 75% match, respectively, with the matched tags. The keyword generation module 918 then generates an additional keyword 920 based on the matched tags, which is calming 1202 that is associated with additional keywords of a yoga getaway 1204. The machine-learning model 926 then generates a third instance of digital content 1206 and a fourth instance of digital content 1208 independently of the actual images, but rather based on the keywords associated with the images. Accordingly, the keywords taken from the first and second instances of digital content 1022, 1024 act as "ingredients" towards generation of the digital images by the content generation module 922. These ingredients may be further augmented in this example by the third keyword which describes an entity segment that is a target of the digital content, brand awareness keywords, and so on thereby improving accuracy that the digital content as generated is of interest to the target entity segment, thereby improving operational efficiency.

The generative AI menu 1004 also includes an option 1210 that is user selectable to cause generation of the digital content to be "brand aware." The option 1210, for instance, is selectable to cause the content generation module 922 to utilize a brand awareness module 930 that is trained on digital content that is proprietary to a particular brand. Accordingly, selection of the option 1210 causes generation of the generated digital image 924 that is visually consistent with that brand, e.g., colors, fonts, shading, themes, and so forth. Similar techniques may also be utilized to incorporate audience awareness through use of an audience awareness module 928 in generating the digital content, e.g., based on keywords associated with a particular entity segment.

Figure 14:
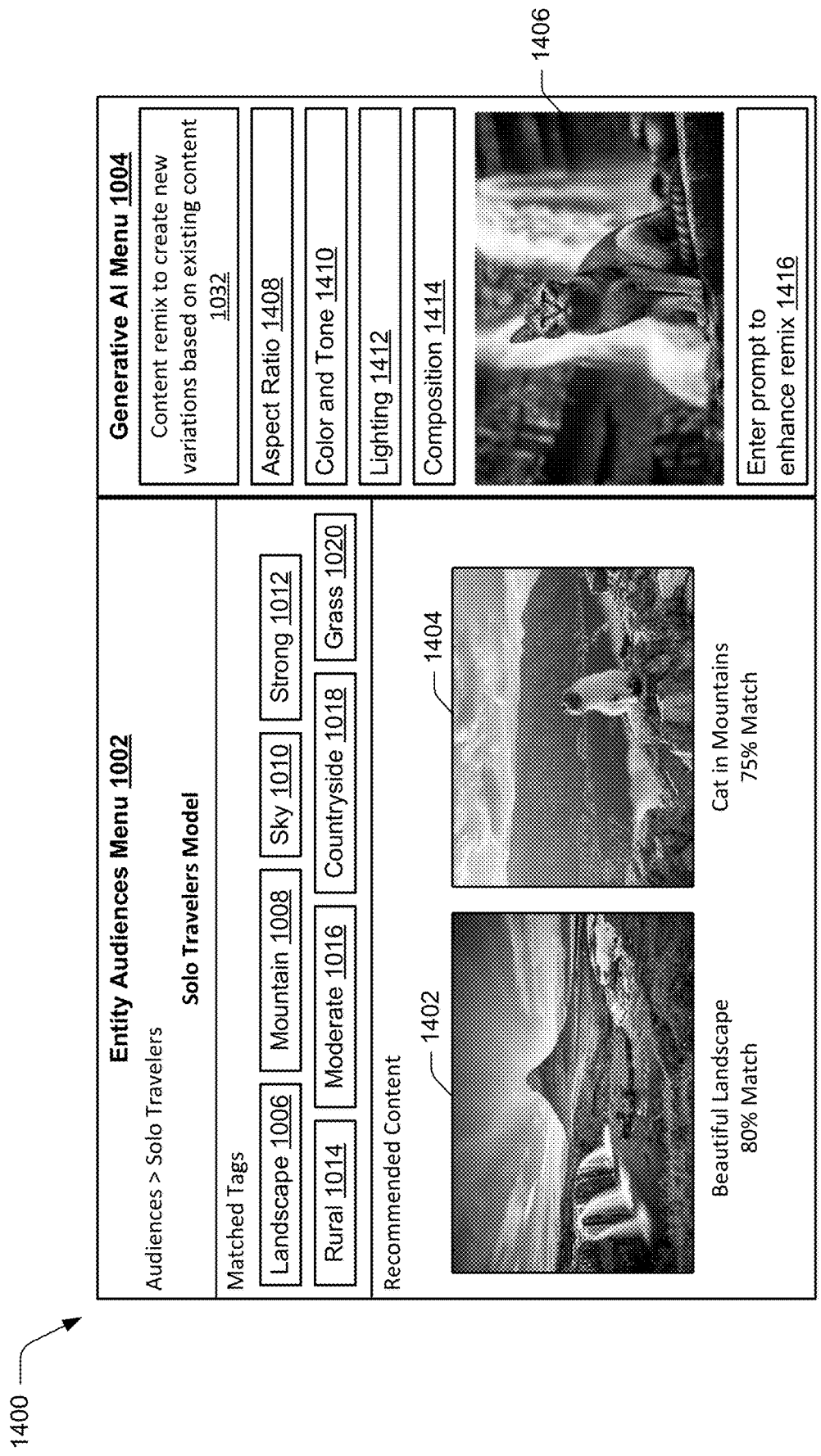
FIG. 14 depicts an example of a user interface configured to support a generative artificial intelligence (AI) assistant in support a content remix to create new variations based on existing content.
Figure 16:
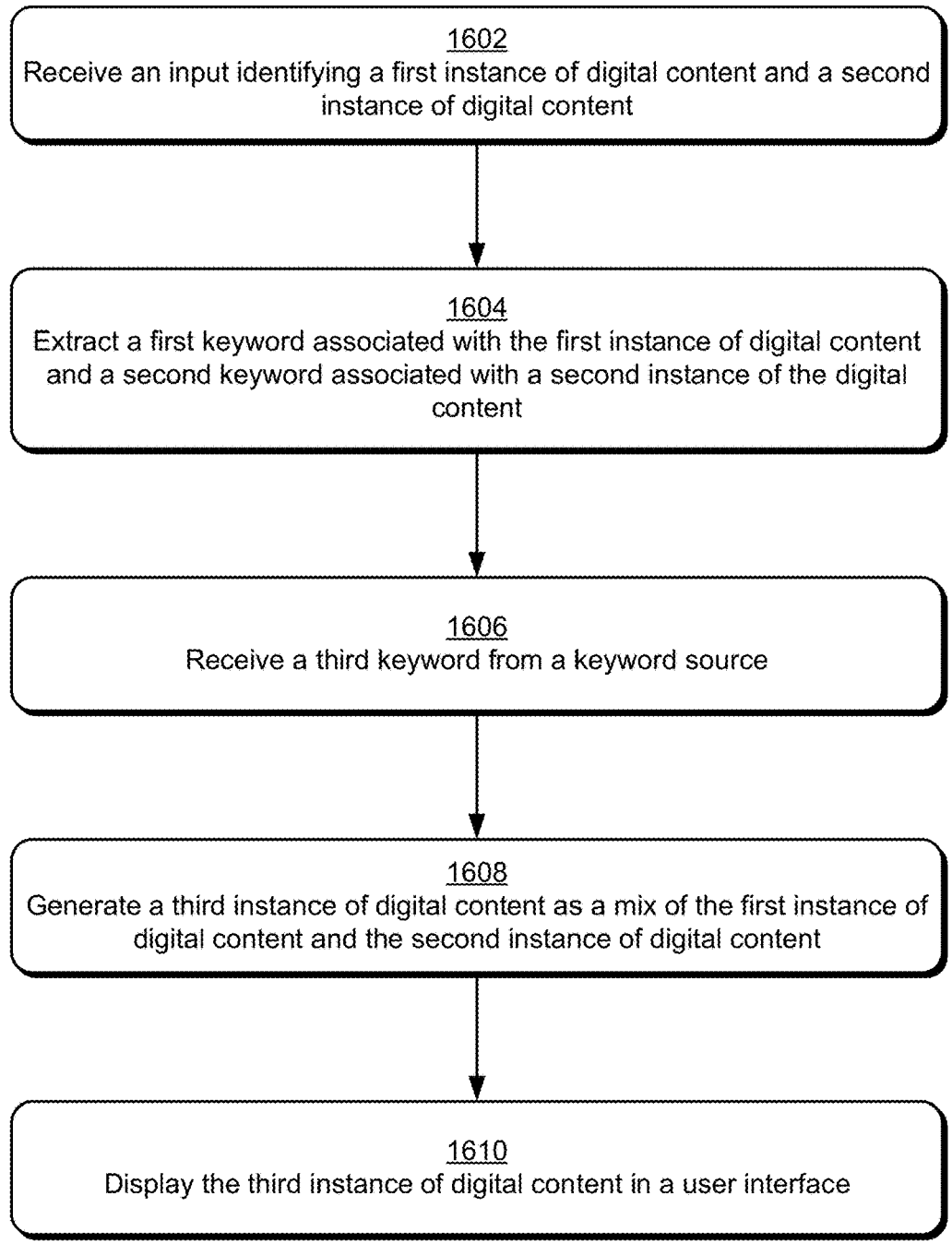
FIG. 16 is a flow diagram depicting a step-by-step procedure in an example implementation of operations performable by a processing device for accomplishing a result of content remix to create new variations based on existing content using a generative artificial intelligence (AI) assistant.

FIG. 14 depicts an example of a user interface 1400 configured to support a generative artificial intelligence (AI) assistant in support a content remix to create new variations based on existing content. FIG. 16 is a flow diagram depicting a step-by-step procedure 1600 in an example implementation of operations performable by a processing device for accomplishing a result of content remix to create new variations based on existing content using a generative artificial intelligence (AI) assistant.

In this example, an option is selected for context remix to create new variations based on existing content 1032. To do so, the content generation module 922 generates digital content based on keywords utilized as "ingredients" to create new variations of selected instances of digital content. The generative AI assistant module 902, for instance, is implemented to detect key subjects from the instances of digital content (e.g., using a feature detection module 912) to create new unique variations independent of direct use of the instances of the digital content, itself.

In the illustrated example, an input is received by the generative AI assistant module 902 via the entity audience menu 1002 that identifies a first instance of digital content 1402 and a second instance of digital content 1404 (block 1602). In response, a first keyword associated with the first instance of digital content 1402 and a second keyword associated with a second instance of the digital content 1404 is extracted (block 1604). The first and second keywords may be extracted in a variety of ways, such as from tags included in metadata associated with the digital content by a keyword collection module 906, processing of the digital content using a classifier as implemented by a machine-learning module 916 of the feature detection module 912, and so forth.

A third keyword, in one or more examples, is also received from an input source 910 (block 1606). The third keyword, for instance, is configurable to describe an entity segment, use of brand awareness, and so on as previously described as an additional keyword that may be used to an additional guide towards generation of the instance of digital content by the content generation module 922.

The content generation module 922 generates a third instance of digital content using a machine-learning model 926 as a mix of the first instance of digital content and the second instance of digital content. The generation of the third instance of digital content is performed using generative artificial intelligence as implemented by at least one machine-learning model based on the first keyword and the second keyword (block 1608) as previously described, which may also include the third keyword as an additional guide. The third instance of digital content is then displayed in a user interface (block 1610), e.g., non-modally within a user interface.

As shown in the user interface 1400 of FIG. 14, for instance, a first instance and second instance of digital content are selected 1402, 1404. The generative AI assistant module 902 then extracts keywords from the digital content, e.g., as "waterfall" from the first instance of digital content 1402 and "cat" from the second instance of digital content 1404 as primary subjects of the respective digital content. The third instance of digital content 1406 is then displayed non-modally within the generative AI menu 1004 of the user interface 1400 in the illustrated example. The generative AI menu 1004 also includes additional options to adjust the third instance of digital content 1406, examples of which include aspect ratio 1408, color and tone 1410, lighting 1412, composition 1414, and an option 1416 to enter a prompt to enhance the remix.

Figure 15:
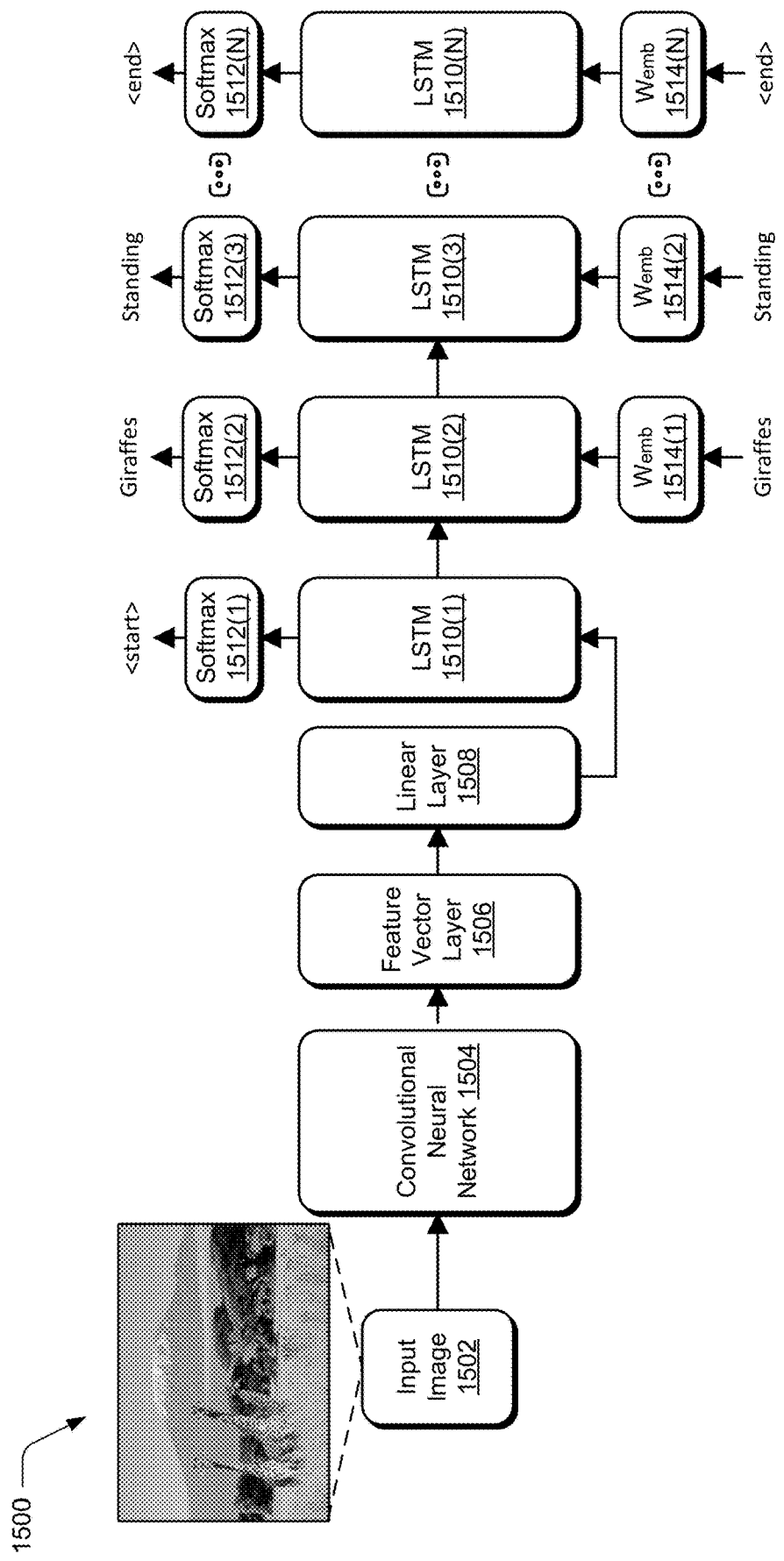
FIG. 15 is a block diagram showing operation of a machine-learning model of FIG. 9 in greater detail as implementing content remix functionality.

FIG. 15 is a block diagram showing operation of a machine-learning model architecture 1500 usable to implement a machine-learning model 926 of FIG. 9 in greater detail as implementing content remix functionality. The machine-learning model architecture 1500 in the illustrated example is configured to remix keywords as text prompts of "ingredients" from respective instances of digital content. An input image 1502 is received and processed by a convolutional neural network 1504, a feature vector layer 1506, and a linear layer 1508 to generate keywords as vector representations of the keywords. The keywords, for instance, may be expressed directly as a feature vector in this example without being converted from text. Other instances are also contemplated in which an output of a classifier is configured as text that is then converted into a vector representation.

The keyword is then passed to a plurality of LSTM 1510(1), 1510(2), 1510(3), . . . , 1510(N) models and associated softmax 1512(1), 1512(2), 1512(3), . . . , 1512(N) functions to process respective word embeddings 1514(1), 1514(2), . . . , 1514(N). The LSTM 1510(1)-1510(N) models, for instance, are configured to process the input data of the word embeddings and output a vector of real numbers. The vector of real numbers is then converted to probabilities using the respective softmax 1512(1)-1514(N) functions. A variety of other examples are also contemplated.

Example System and Device

Figure 17:
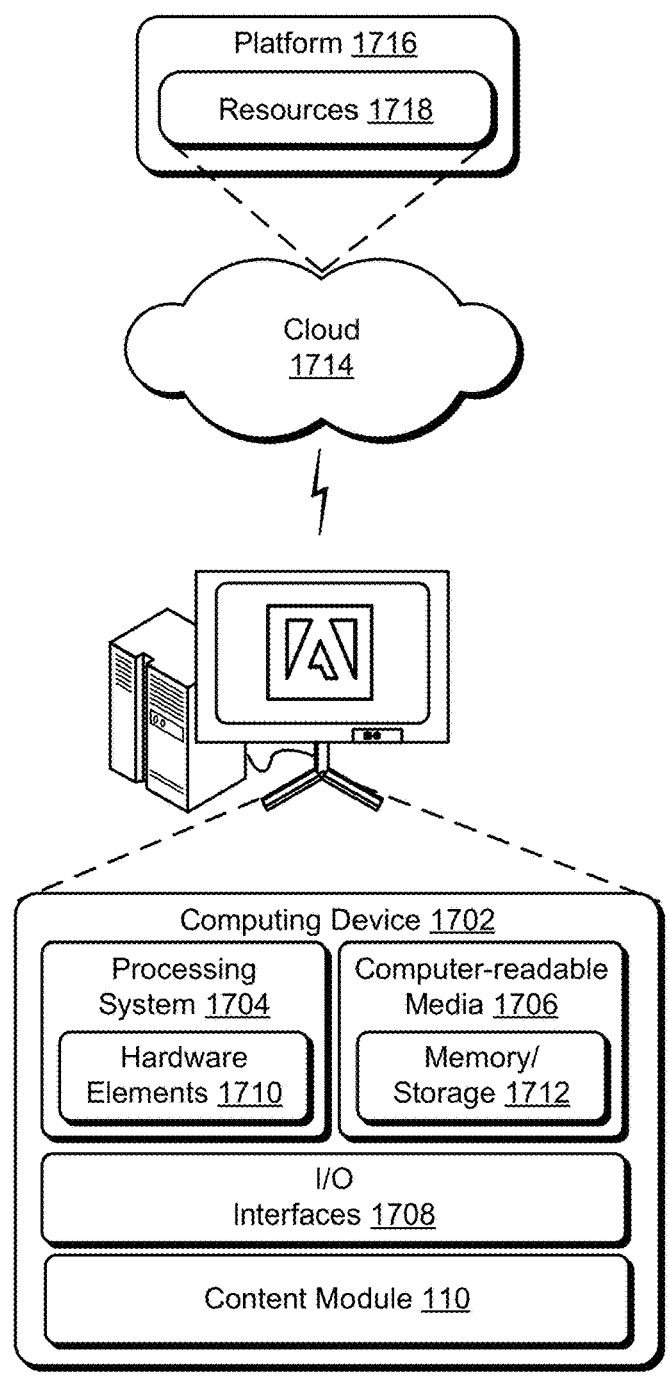
FIG. 17 illustrates an example system that includes an example computing device that is representative of one or more computing systems and/or devices for implementing the various techniques described herein.

FIG. 17 illustrates an example system 1700 that includes an example computing device that is representative of one or more computing systems and/or devices that are usable to implement the various techniques described herein. This is illustrated through inclusion of the content module 110. The computing device 1702 includes, for example, a server of a service provider, a device associated with a client (e.g., a client device), an on-chip system, and/or any other suitable computing device or computing system.

The example computing device 1702 as illustrated includes a processing system 1704, one or more computer-readable media 1706, and one or more I/O interfaces 1708 that are communicatively coupled, one to another. Although not shown, the computing device 1702 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1704 is representative of functionality to perform one or more operations using hardware. Accordingly, the processing system 1704 is illustrated as including hardware elements 1710 that are configured as processors, functional blocks, and so forth. This includes example implementations in hardware as an application specific integrated circuit or other logic device formed using one or more semiconductors. The hardware elements 1710 are not limited by the materials from which they are formed or the processing mechanisms employed therein. For example, processors are comprised of semiconductor(s) and/or transistors (e.g., electronic integrated circuits (ICs)). In such a context, processor-executable instructions are, for example, electronically-executable instructions.

The computer-readable media 1706 is illustrated as including memory/storage 1712. The memory/storage 1712 represents memory/storage capacity associated with one or more computer-readable media. In one example, the memory/storage 1712 includes volatile media (such as random access memory (RAM)) and/or nonvolatile media (such as read only memory (ROM), Flash memory, optical disks, magnetic disks, and so forth). In another example, the memory/storage 1712 includes fixed media (e.g., RAM, ROM, a fixed hard drive, and so on) as well as removable media (e.g., Flash memory, a removable hard drive, an optical disc, and so forth). The computer-readable media 1706 is configurable in a variety of other ways as further described below.

Input/output interface(s) 1708 are representative of functionality to allow a user to enter commands and information to computing device 1702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that is accessible to the computing device 1702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1710 and computer-readable media 1706 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1710. For example, the computing device 1702 is configured to implement particular instructions and/or functions corresponding to the software and/or hardware modules. Accordingly, implementation of a module that is executable by the computing device 1702 as software is achieved at least partially in hardware, e.g., through use of computer-readable storage media and/or hardware elements 1710 of the processing system 1704. The instructions and/or functions are executable/operable by one or more articles of manufacture (for example, one or more computing devices 1702 and/or processing systems 1704) to implement techniques, modules, and examples described herein.

The techniques described herein are supportable by various configurations of the computing device 1702 and are not limited to the specific examples of the techniques described herein. This functionality is also implementable entirely or partially through use of a distributed system, such as over a "cloud" 1714 as described below.

The cloud 1714 includes and/or is representative of a platform 1716 for resources 1718. The platform 1716 abstracts underlying functionality of hardware (e.g., servers) and software resources of the cloud 1714. For example, the resources 1718 include applications and/or data that are utilized while computer processing is executed on servers that are remote from the computing device 1702. In some examples, the resources 1718 also include services provided over the Internet and/or through a subscriber network, such as a cellular or Wi-Fi network.

The platform 1716 abstracts the resources 1718 and functions to connect the computing device 1702 with other computing devices. In some examples, the platform 1716 also serves to abstract scaling of resources to provide a corresponding level of scale to encountered demand for the resources that are implemented via the platform. Accordingly, in an interconnected device embodiment, implementation of functionality described herein is distributable throughout the system 1700. For example, the functionality is implementable in part on the computing device 1702 as well as via the platform 1716 that abstracts the functionality of the cloud 1714.

In some aspects, the techniques described herein relate to a method including: receiving, by a processing device, input data describing attributes of an entity segment and keywords that are associated with the attributes of the entity segment; determining, by the processing device, additional keywords from a keyword corpus that are semantically similar to the keywords using a machine-learning model trained on training data to classify semantically similar keywords; compiling, by the processing device, a set of matchable keywords that includes the keywords and the additional keywords; identifying, by the processing device, candidate instances of digital content from a content repository based on content keywords assigned to the candidate instances of digital content and the set of matchable keywords; and generating, by the processing device, an indication of an instance of digital content for display in a user interface based on the candidate instances of digital content.

What is claimed is:

1. A method comprising:
receiving, by a processing device, input data describing attributes of an entity segment and keywords that are associated with the attributes of the entity segment;
computing, by the processing device, numerical vector-based representations of the keywords using a machine-learning model trained on training data to classify semantically similar keywords;
identifying, by the processing device, additional keywords from a keyword corpus that are semantically similar to the keywords by comparing the numerical vector-based representations of the keywords with numerical vector-based representations of keywords of the keyword corpus using the machine-learning model and determining whether the keywords and the additional keywords have a threshold amount of similarity;
compiling, by the processing device, a set of matchable keywords that includes the keywords and the additional keywords;
identifying, by the processing device, candidate instances of digital content from a content repository based on comparing content keywords assigned to the candidate instances of the digital content and the set of matchable keywords; and
generating, by the processing device, an indication of an instance of the digital content for display in a user interface based on the candidate instances of the digital content.

2. The method as described in claim 1, wherein the machine-learning model includes a naive Bayes classifier.

3. The method as described in claim 1, wherein the machine-learning model includes a natural language processing model.

4. The method as described in claim 1, wherein the keywords that are associated with the attributes of the entity segment are determined based on analytics data describing interactions of entities included in the entity segment.

5. The method as described in claim 1, wherein the instance of the digital content is at least one of a reusable digital image, a reusable digital video, a reusable content fragment, or a reusable experience fragment.

6. The method as described in claim 1, further comprising generating an indication of an additional instance of the digital content for display in the user interface relative to the indication of the instance of the digital content based on a match score for the instance of the digital content and a match score for the additional instance of the digital content.

7. The method as described in claim 6, wherein the indication of the additional instance of digital content is generated based on a user input that modifies the attributes of the entity segment.

8. The method as described in claim 6, wherein the indication of the additional instance of digital content is generated based on a user input that modifies the set of matchable keywords.

9. The method as described in claim 6, wherein the indication of the additional instance of digital content is generated based on an addition of the additional instance of digital content to the content repository.

10. The method as described in claim 1, wherein the instance of digital content is selected from the candidate instances of digital content based on an amount of semantic overlap between a set of the content keywords assigned to the instance of digital content and the set of matchable keywords.

11. The method as described in claim 1, further comprising identifying a candidate instance of digital content of the candidate instances of digital content based on a score indicating an amount of semantic overlap between the set of matchable keywords and the content keywords assigned to the candidate instances of digital content corresponding to the candidate instance of digital content.

12. A system comprising:
a memory component; and
a processing device coupled to the memory component, the processing device to perform operations comprising:
receiving input data describing attributes of an entity segment and first keywords that are associated with the attributes of the entity segment;
computing numerical vector-based representations of the first keywords using a first machine-learning model trained on training data to classify semantically similar keywords;
compiling a set of matchable keywords that includes the first keywords and second keywords that are semantically similar to the first keywords based on whether the first keywords and the second keywords have a threshold amount of similarity:
forming a search input that includes the set of matchable keywords by comparing the numerical vector-based representations of the first keywords with numerical vector-based representations of keywords of a keyword corpus, the second keywords identified by processing the input data using the first machine-learning model;
generating match scores for instances of digital content based on the search input and sets of content keywords, the sets of content keywords assigned to the instances of digital content using a second machine-learning model trained on training data to assign keywords to digital content; and
generating an indication of an instance of digital content for display in a user interface based on the match scores.

13. The system as described in claim 12, wherein the first machine-learning model includes a naive Bayes classifier and a natural language processing model.

14. The system as described in claim 12, wherein the operations further comprise generating an indication of an additional instance of digital content for display in the user interface based on a user input that modifies the search input.

15. The system as described in claim 12, wherein the operations further comprise generating an indication of an additional instance of digital content for display in the user interface based on a user input that modifies the attributes of the entity segment.

16. A non-transitory computer-readable storage medium storing executable instructions, which when executed by a processing device, cause the processing device to perform operations comprising:
receiving input data describing attributes of an entity segment and keywords that are associated with the attributes of the entity segment;
computing numerical vector-based representations of the keywords using a machine-learning model trained on training data to classify semantically similar keywords;
identifying additional keywords from a keyword corpus that are semantically similar to the keywords by comparing the numerical vector-based representations of the keywords with numerical vector-based representations of keywords of the keyword corpus using the machine-learning model and determining whether the keywords and the additional keywords have a threshold amount of similarity;

compiling a set of matchable keywords that includes the keywords and the additional keywords;

identifying candidate instances of digital content from a content repository based on comparing content keywords assigned to the candidate instances of digital content and the set of matchable keywords; and generating an indication of an instance of digital content for display in a user interface based on the candidate instances of digital content.

17. The non-transitory computer-readable storage medium as described in claim 16, wherein the instance of digital content is at least one of a reusable digital image, a reusable digital video, a reusable content fragment, or a reusable experience fragment.

18. The non-transitory computer-readable storage medium as described in claim 16, wherein the keywords that are associated with the attributes of the entity segment are determined based on analytics data describing interactions of entities included in the entity segment.

19. The non-transitory computer-readable storage medium as described in claim 16, wherein the machine-learning model includes a naive Bayes classifier.

20. The non-transitory computer-readable storage medium as described in claim 16, wherein the machine-learning model includes a natural language processing model.

\* \* \* \* \*